US012764608B2

(12) United States Patent
Izhaki et al.

(10) Patent No.: US 12,764,608 B2
(45) Date of Patent: Oct. 13, 2026

(54) NETWORK SLICE FEASIBILITY ASSESSMENT FOR SLICE ORCHESTRATION IN A WIRELESS NETWORK

(71) Applicant: QUALCOMM Incorporated, San Diego, CA (US)

(72) Inventors: Gal Izhaki, Haifa (IL); German David Castaneda, Bogotá (CO); Daniel Yellin, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/470,268

(22) Filed: Sep. 19, 2023

(65) Prior Publication Data

US 2025/0016627 A1 Jan. 9, 2025

Related U.S. Application Data

(60) Provisional application No. 63/511,817, filed on Jul. 3, 2023.

(51) Int. Cl.
*H04W 28/24* (2009.01)
*H04W 28/08* (2023.01)
*H04W 72/0453* (2023.01)

(52) U.S. Cl.
CPC ........... *H04W 28/24* (2013.01); *H04W 28/08* (2013.01); *H04W 72/0453* (2013.01)

(58) Field of Classification Search
CPC .. H04W 28/24; H04W 28/08; H04W 72/0453
See application file for complete search history.

(56) References Cited

U.S. PATENT DOCUMENTS 11,336,538 B2 5/2022 Akman et al.
11,622,315 B2 4/2023 Lou et al.
(Continued)

FOREIGN PATENT DOCUMENTS

CN 113472595 B 4/2023
GB 2574247 A 12/2019

OTHER PUBLICATIONS

International Search Report and Written Opinion—PCT/US2024/032664—ISA/EPO—Sep. 27, 2024 (2305525WO).

*Primary Examiner* — Blake J Rubin
(74) *Attorney, Agent, or Firm* — Holland & Hart LLP/Qualcomm

(57) ABSTRACT

This disclosure provides systems, methods and apparatus, including computer programs encoded on computer storage media, for network slice feasibility assessment for slice orchestration in a wireless network. Some aspects relate to providing on-demand approval or rejection of a requested network slice at a device associated with service management. The device may select respective resource allocations of the requested network slice for each cell of a set of cells in a wireless network, add the respective predicted resource allocations to respective current resource utilizations at each of the cells, and output a recommendation associated with the requested network slice in accordance with the summations. The device may select the respective resource allocations of the requested network slice in accordance with a service level agreement (SLA) of the requested network slice and, in some implementations, observed network conditions at each of the cells in the wireless network.

28 Claims, 11 Drawing Sheets

(56) References Cited

U.S. PATENT DOCUMENTS

| | | | | |
|---|---|---|---|---|
| 2018/0317133 | A1* | 11/2018 | Sciancalepore | H04W 24/02 |
| 2019/0174498 | A1* | 6/2019 | Samdanis | H04W 16/10 |
| 2020/0059521 | A1* | 2/2020 | Sciancalepore | H04L 67/12 |
| 2021/0112436 | A1* | 4/2021 | Hoffner | H04L 41/5025 |
| 2021/0160153 | A1* | 5/2021 | Akman | H04W 36/26 |
| 2021/0211942 | A1* | 7/2021 | Guo | H04L 41/40 |
| 2021/0241090 | A1* | 8/2021 | Chen | H04W 24/02 |
| 2021/0337553 | A1* | 10/2021 | Chong | H04L 41/5019 |
| 2022/0116811 | A1* | 4/2022 | Li | H04W 24/10 |
| 2022/0124560 | A1* | 4/2022 | Yeh | H04W 28/18 |
| 2023/0006889 | A1* | 1/2023 | Thyagaturu | H04L 41/5054 |
| 2023/0023283 | A1* | 1/2023 | Lennartson | H04B 17/336 |
| 2023/0171592 | A1* | 6/2023 | Han | H04W 8/20<br>370/328 |
| 2023/0179490 | A1* | 6/2023 | Huangfu | H04W 24/02<br>370/252 |
| 2023/0239030 | A1* | 7/2023 | Yao | H04B 7/0617<br>375/262 |
| 2023/0345359 | A1* | 10/2023 | Yang | H04W 52/0206 |
| 2023/0362678 | A1* | 11/2023 | Bega | H04W 24/04 |
| 2023/0403543 | A1* | 12/2023 | Pateromichelakis | H04W 4/50 |
| 2024/0098566 | A1* | 3/2024 | Gemelli | H04W 28/086 |
| 2024/0152820 | A1* | 5/2024 | Singh | H04W 24/02 |
| 2024/0196376 | A1* | 6/2024 | Wang | H04W 24/02 |
| 2024/0305533 | A1* | 9/2024 | Bai | H04W 24/02 |
| 2025/0021890 | A1* | 1/2025 | Shi | H04W 24/02 |
| 2025/0047570 | A1* | 2/2025 | Vandikas | H04W 24/02 |
| 2025/0063431 | A1* | 2/2025 | Ali | H04W 36/362 |
| 2025/0080423 | A1* | 3/2025 | Kumar | H04L 41/0894 |
| 2025/0081010 | A1* | 3/2025 | Bedekar | H04W 24/02 |
| 2025/0088908 | A1* | 3/2025 | Shi | H04W 24/02 |
| 2025/0227488 | A1* | 7/2025 | Yan | G06N 20/00 |

* cited by examiner

NETWORK SLICE FEASIBILITY ASSESSMENT FOR SLICE ORCHESTRATION IN A WIRELESS NETWORK

CROSS REFERENCE TO RELATED APPLICATIONS

The present application for patent claims the benefit of U.S. Provisional Patent Application No. 63/511,817 by IZHAKI et al., entitled "NETWORK SLICE FEASIBILITY ASSESSMENT FOR SLICE ORCHESTRATION IN A WIRELESS NETWORK," filed Jul. 3, 2023, which is assigned to the assignee hereof, and which is expressly incorporated by reference herein.

TECHNICAL FIELD

This disclosure relates to wireless communications, including network slice feasibility assessment for slice orchestration in a wireless network.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a device associated with service management of a wireless network. The device may include a processing system that includes processor circuitry and memory circuitry that stores code. The processing system may be configured to cause the device to receive, at a device associated with service management of the wireless network, a request associated with a network slice in the wireless network, the request indicating one or more parameters associated with a service level agreement (SLA) of the network slice, select, in accordance with the one or more parameters associated with the SLA, a respective physical resource block (PRB) allocation of the network slice for each cell of a set of cells of the wireless network, and outputting, to a network slice management function and in accordance with a respective PRB utilization at each cell of the set of cells and the respective PRB allocation of the network slice for each cell of the set of cells, a recommendation associated with the network slice.

Another innovative aspect of the subject matter described in this disclosure can be implemented in a method for network slice management in a wireless network. The method may include receiving, at a device associated with service management of the wireless network, a request associated with a network slice in the wireless network, the request indicating one or more parameters associated with an SLA of the network slice, selecting, in accordance with the one or more parameters associated with the SLA, a respective PRB allocation of the network slice for each cell of a set of cells of the wireless network, and outputting, to a network slice management function and in accordance with a respective PRB utilization at each cell of the set of cells and the respective PRB allocation of the network slice for each cell of the set of cells, a recommendation associated with the network slice.

Another innovative aspect of the subject matter described in this disclosure can be implemented in a device associated with service management of a wireless network. The device may include means for receiving a request associated with a network slice in the wireless network, the request indicating one or more parameters associated with an SLA of the network slice, means for selecting, in accordance with the one or more parameters associated with the SLA, a respective PRB allocation of the network slice for each cell of a set of cells of the wireless network, and means for outputting, to a network slice management function and in accordance with a respective PRB utilization at each cell of the set of cells and the respective PRB allocation of the network slice for each cell of the set of cells, a recommendation associated with the network slice.

Another innovative aspect of the subject matter described in this disclosure can be implemented in a non-transitory computer-readable medium storing code for network slice management in a wireless network. The code may include instructions executable by a processing system (such as by one or more processors, individually or collectively), to receive, at a device associated with service management of the wireless network, a request associated with a network slice in the wireless network, the request indicating one or more parameters associated with an SLA of the network slice, select, in accordance with the one or more parameters associated with the SLA, a respective PRB allocation of the network slice for each cell of a set of cells of the wireless network, and outputting, to a network slice management function and in accordance with a respective PRB utilization at each cell of the set of cells and the respective PRB allocation of the network slice for each cell of the set of cells, a recommendation associated with the network slice.

In some implementations of the method, devices, and non-transitory computer-readable medium described herein, selecting the respective PRB allocation of the network slice for each cell of the set of cells may include operations, features, means, or instructions for predicting the respective PRB allocation of the network slice for each cell of the set of cells in accordance with the one or more parameters associated with the SLA.

In some implementations of the method, devices, and non-transitory computer-readable medium described herein, predicting the respective PRB allocation of the network slice for each cell of the set of cells may include operations, features, means, or instructions for predicting the respective PRB allocation of the network slice for each cell of the set of cells in accordance with both the one or more parameters associated with the SLA and observed network conditions at the set of cells.

Some implementations of the method, devices, and non-transitory computer-readable medium described herein may further include operations, features, means, or instructions for scanning the set of cells of the wireless network in accordance with respective summations of respective PRB utilizations at the set of cells and respective PRB allocations of the network slice for the set of cells, where outputting the recommendation associated with the network slice may be in accordance with scanning the set of cells.

Some implementations of the method, devices, and non-transitory computer-readable medium described herein may further include operations, features, means, or instructions for training a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, where the prediction may be associated with observed network conditions at the set of cells of the wireless network.

In some implementations of the method, devices, and non-transitory computer-readable medium described herein, training the machine learning model may include operations, features, means, or instructions for providing, as a training set associated with the machine learning model, a set of multiple network snapshots, where each network snapshot of the set of multiple network snapshots corresponds to a suitable PRB allocation to a requested network slice and may be associated with a unique permutation of one or more cell types, one or more cluster sizes, one or more cell physical characteristics, one or more cell load conditions, or one or more cell channel quality distributions, one or more interference levels, or any combination thereof.

In some implementations of the method, devices, and non-transitory computer-readable medium described herein, training the machine learning model may include operations, features, means, or instructions for receiving, at the device associated with the service management of the wireless network and in accordance with deployment of the network slice in the wireless network, information indicative of one or more performance indicators associated with the network slice and updating the machine learning model in accordance with the one or more performance indicators.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
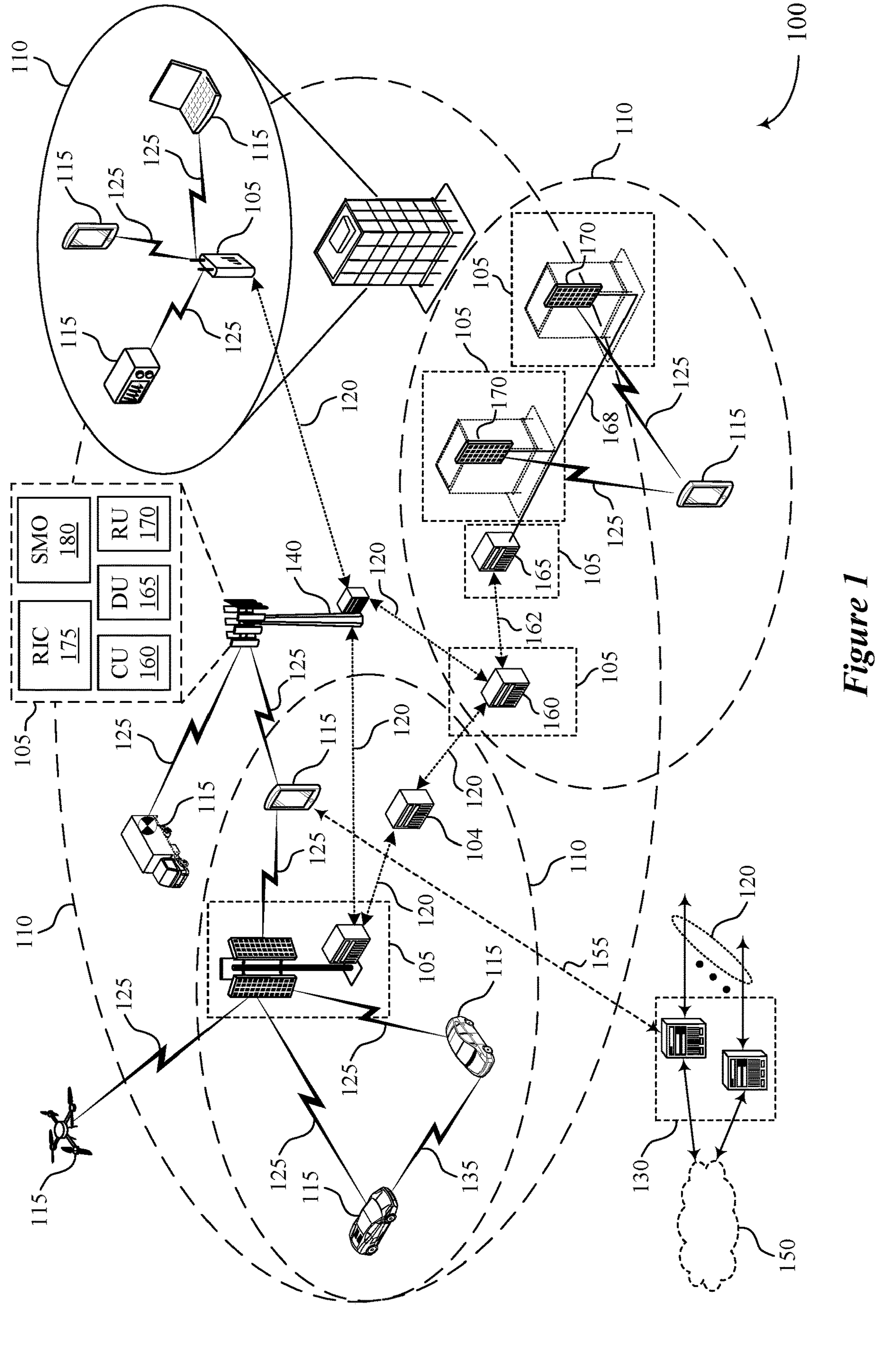
FIG. 1 shows an example wireless communication system that supports network slice feasibility assessment for slice orchestration in a wireless network.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G), fifth generation (5G), or sixth generation (6G), or further implementations thereof, technology.

Various aspects relate generally to providing an on-demand approval or rejection of a requested network slice at a device associated with service management of a wireless network. Some aspects more specifically relate to predicting (such as selecting, calculating, ascertaining, or otherwise determining) a cell load of a requested network slice for each cell (or for various groups of cells) of a set of cells in a wireless network and outputting an approval or a rejection of the requested network slice in accordance with the predicted cell loads. In some aspects, an approval or a rejection of the requested network slice may be associated with a summation of the predicted cell loads and a current cell load at each of the cells (or across various groups of cells) in the wireless network. Such an approval or a rejection of the requested network slice may be understood or otherwise referred to as a recommendation associated with the requested network slice. A predicted cell load may be associated with a predicted physical resource block (PRB) allocation and, in some implementations, the device associated with service management may predict respective (such as per cell) PRB allocations of the requested network slice in accordance with a service level agreement (SLA) of the requested network slice. In some further implementations, the device may predict the respective (such as per cell) PRB allocations of the requested network slice in accordance with both the SLA of the requested network slice and cell modeling associated with observed network conditions at each of the cells (or at various groups of cells) in the wireless network. Such observed network conditions may include any conditions or parameters that can contribute to cell modeling, including one or more of a channel quality distribution, a frequency band, a traffic behavior, a duplexing mode, a network morphology, a modulation and coding scheme (MCS), or a rank indicator (RI), among other examples.

The device, which may be associated with (such as perform functions related to or corresponding to) service management and orchestration (SMO), may output an approval or a rejection of a requested network slice toward a network slice management function (NSMF) and, in some implementations, may condition the approval or rejection in accordance with a slice admission policy associated with the requested network slice. A slice admission policy associated with a requested network slice may indicate a threshold user coverage or a threshold percentage of accommodating cells (such as cells able to accommodate the requested network slice), or both, for admission of the requested network slice to the wireless network. For example, if fewer than a threshold quantity of intended users are able to be served by the requested network slice or if fewer than a threshold quantity of cells are able to accommodate the requested network slice (in accordance with a current cell load plus a predicted cell load associated with the requested network slice), the device may reject the requested network slice. Otherwise, the device may approve the requested network slice.

In some implementations, the device may train (such as configure) a machine learning (ML) or artificial intelligence (AI) model to output an approval or a rejection of a requested network slice. In such implementations, the device may train the ML/AI model in accordance with one or more of predicted cell loads, current cell loads (such as current PRB utilizations), one or more radio frequency (RF) metrics, or a morphology of the wireless network, among other examples. Additionally, or alternatively, the device may train the ML/AI model in accordance with a set of network snapshots. A network snapshot may correspond a suitable PRB allocation to a requested network slice and may be associated with a unique permutation of one or more cell types, one or more cluster sizes, one or more cell physical characteristics, one or more cell load conditions, or one or more cell channel quality distributions, one or more interference levels, or any combination thereof. In other words, for a given permutation of such various parameters and conditions, a network snapshot may indicate a correspondence between a requested network slice and a suitable PRB allocation. If a requested network slice is deployed in the wireless network, the device may update (such as refine or retrain) the ML/AI model over time in accordance with one or more performance indicators associated with the network slice or other live network statistics.

Particular aspects of the subject matter described in this disclosure can be implemented to realize one or more of the following potential advantages. In some implementations, by enabling such an on-demand approval or rejection of a requested network slice, the device may support a timely prediction of a quantity of PRBs for different types of cells for a requested network slice. Further, in accordance with predicting respective (such as per cell) PRB allocations of a requested network slice in accordance with one or both of an SLA and observed network conditions, the device may provide accurate empirical resource allocation predictions, which may allow, enable, or otherwise facilitate more efficient spectrum usage. For example, the described techniques to predict per cell PRB allocations using per cell modeling may reduce the likelihood of or avoid PRB over-dimensioning (which may result in spectrum loss) and PRB under-dimensioning (which may result in an SLA violation), both of which may be relatively more common when using a single predicted PRB allocation value for all cells. Additionally, in accordance with conditioning an approval or rejection of a requested network slice in accordance with a slice admission policy, the described techniques may allow a user or mobile network operator (MNO) to adjust one or more evaluation thresholds to network-specific performance, which may provide greater flexibility and more granular control over whether and how a requested network slice is admitted. In accordance with such timely predictions, more efficient spectrum usage (which may be understood as greater spectral efficiency), greater flexibility, and more granular control, the described techniques may be further implemented to realize, achieve, or support higher data rates, greater system capacity, and greater reliability, among other benefits.

FIG. 1 shows an example of a wireless communication system 100 that supports network slice feasibility assessment for slice orchestration in a wireless network. The wireless communication system 100 may include one or more network entities 105, one or more UEs 115, and a core network 130. In some implementations, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communication system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or another interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communication systems (such as wireless communication system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support network slice feasibility assessment for slice orchestration in a wireless network as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communication systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communication system 100 and may be referred to as a transmission time interval (TTI). In some implementations, the TTI duration (such as a quantity of symbol periods in a TTI) may be variable. Additionally, or alternatively, the smallest scheduling unit of the wireless communication system 100 may be dynamically selected (such as in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (such as using a carrier) and may be associated with an identifier for distinguishing neighboring cells (such as a physical cell identifier (PCID), a virtual cell identifier (VCID), or others). In some implementations, a cell also may refer to a coverage area 110 or a portion of a coverage area 110 (such as a sector) over which the logical communication entity operates. Such cells may range from smaller areas (such as a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered network entity 105 (such as a lower-powered BS 140), as compared with a macro cell, and a small cell may operate using the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A network entity 105 may support one or multiple cells and also may support communications via the one or more cells using one or multiple component carriers.

In some implementations, a carrier may support multiple cells, and different cells may be configured according to different protocol types (such as MTC, narrowband IoT (NB-IoT), enhanced mobile broadband (eMBB)) that may provide access for different types of devices.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may be configured to support ultra-reliable communications or low-latency communications, or various combinations thereof. For example, the wireless communication system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be associated with a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some aspects, the wireless communication system 100 may support one or more signaling- or configuration-based mechanisms associated with network slice management. For example, the wireless communication system 100 may support one or multiple network slices and may dynamically (such as in an on-demand manner) add new network slices in accordance with a resource availability within the wireless communication system 100. In some implementations, one or more devices, components, entities, or functionalities of the wireless communication system 100 (such as a network entity 105, or any one or more components, entities, or functionalities of a network entity 105) may support an automated slice configuration process, as part of RAN orchestration, according to which a requested network slice may be approved (such as admitted and implemented) or rejected.

In some implementations, one or more devices, components, entities, or functionalities associated with (such as part of) a network platform may perform operations of the automated slice configuration process, and slicing configuration capabilities may be included in the network platform. The network automation may support slice configuration capabilities associated with network slice subnet management function (NSSMF) representational state transfer (REST) application programming interface (API) support, a feasibility check and resource allocation procedure, and a programmable policy associated with an MNO design.

In some aspects, NSSMF REST API support may include or be associated with life cycle management (LCM) supported actions of "allocate/active" through to "deactivate/delete" and status updates associated with different operations. A feasibility check and resource allocation procedure may include or be associated with a vendor agnostic calculation procedure and feasibility evaluation results that are in accordance with a comparison of measured versus projected resource (such as PRB) utilization. A programmable policy associated with an MNO design may include or be associated with a programmability engine for provisioning, which may translate an MNO policy into RAN parameters. As such, in accordance with the example implementations described herein, one or more devices, components, entities, or functionalities of the wireless communication system 100 may implement an automated slice configuration process from slice admission to implementation (such as configuration or provisioning) in a dynamic and on-demand manner, which may satisfy one or more latency targets associated with network slice requests, facilitate greater data rates and higher reliability, and support greater spectral efficiency, among other benefits.

Figure 2:
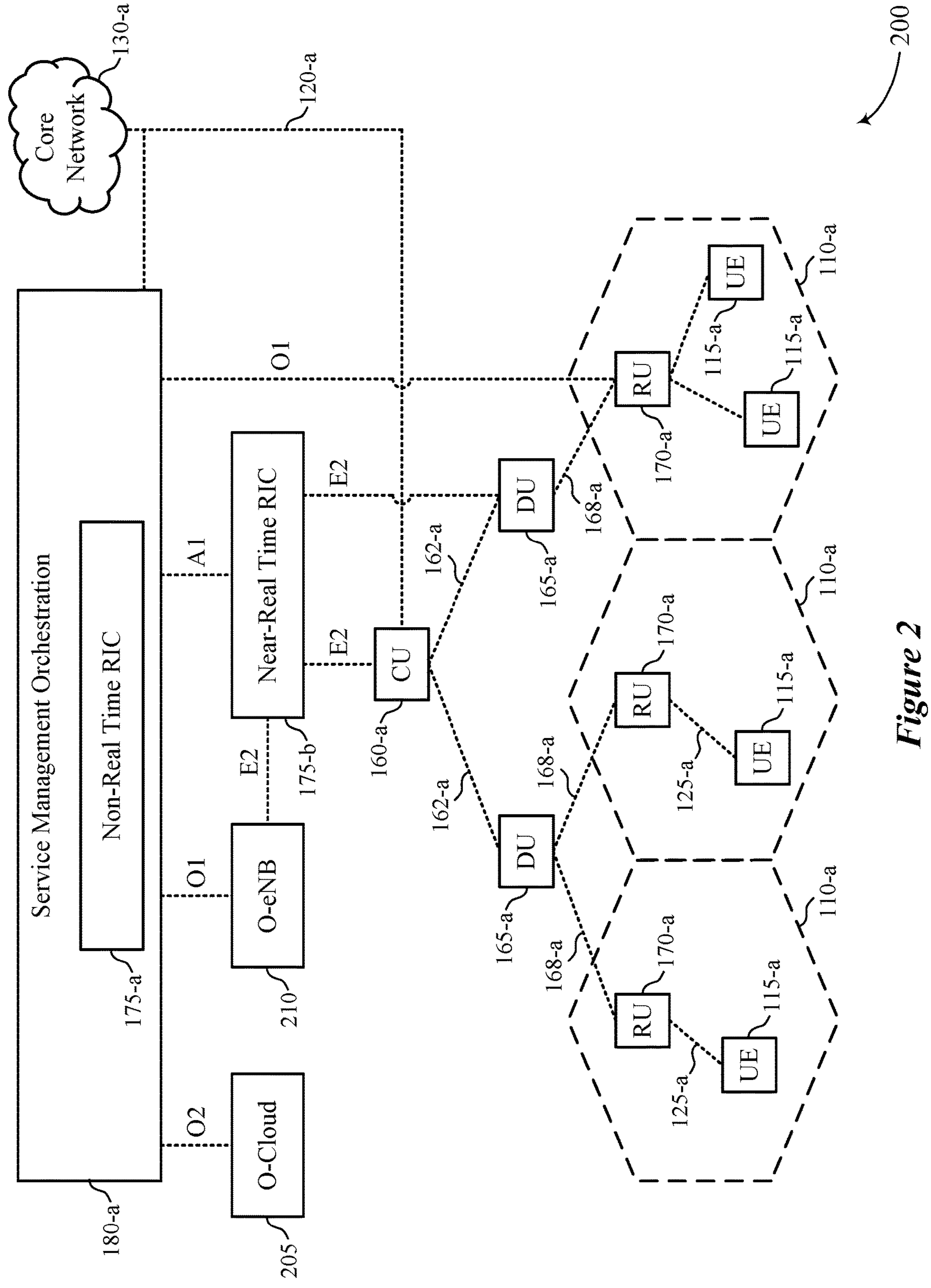
FIGS. 2 and 3 show example network architectures that support network slice feasibility assessment for slice orchestration in a wireless network.

FIG. 2 shows an example network architecture 200 that supports network slice feasibility assessment for slice orchestration in a wireless network. (such as a disaggregated base station architecture, a disaggregated RAN architecture) that supports network slice feasibility assessment for slice orchestration in a wireless network. The network architecture 200 may illustrate an example for implementing one or more aspects of the wireless communication system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (such as a Near-RT RIC 175-*b* via an E2 link, or a Non-RT RIC 175-*a* associated with an SMO 180-*a* (such as an SMO Framework), or both). A CU 160-*a* may communicate with one or more DUs 165-*a* via respective midhaul communication links 162-*a* (such as an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (such as CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (such as data, information) via a wired or wireless transmission medium. Each network entity 105, or an associated processor (such as controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (such as an RF transceiver) configured to receive or transmit signals, or both, over a wireless transmission medium to one or more of the other network entities 105.

In some implementations, a CU 160-*a* may host one or more higher layer control functions. Such control functions may include RRC, PDCP. SDAP, or the like. Each control function may be implemented with an interface configured to communicate signals with other control functions hosted by the CU 160-*a*. A CU 160-*a* may be configured to handle user plane functionality (such as CU-UP), control plane functionality (such as CU-CP), or a combination thereof. In some implementations, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (such as base station functions, RAN functions) to control the operation of one or more RUs 170-*a*. In some implementations, a DU 165-*a* may host, at least partially, one or more of an RLC layer, a MAC layer, and one or more aspects of a PHY layer (such as a high PHY layer, such as modules for FEC encoding and decoding, scrambling, modulation and demodulation, or the like) depending, at least in part, on a functional split, such as those defined by the 3rd Generation Partnership Project (3GPP). In some implementations, a DU 165-*a* may further host one or more low PHY layers. Each layer may be implemented with an interface configured to communicate signals with other layers hosted by the DU 165-*a*, or with control functions hosted by a CU 160-*a*.

In some implementations, lower-layer functionality may be implemented by one or more RUs 170-*a*. For example, an RU 170-*a*, controlled by a DU 165-*a*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, in accordance with the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some implementations, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (such as an O1 interface). For virtualized network entities 105, the SMO 180-*a* may be configured to interact with a cloud computing platform (such as an O-Cloud 205) to perform network entity life cycle management (such as to instantiate virtualized network entities 105) via a cloud computing platform interface (such as an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (such as via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (such as via an A1 interface) the Near-RT RIC 175-*b*. The Near-RT RIC 175-*b* may be configured to include a logical function that enables near-real-time control and optimization of RAN elements and resources via data collection and actions over an interface (such as via an E2 interface) connecting one or more CUs 160-*a*, one or more DUs 165-*a*, or both, as well as an O-eNB 210, with the Near-RT RIC 175-*b*.

In some implementations, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some implementations, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (such as reconfiguration via O1) or via generation of RAN management policies (such as A1 policies).

In accordance with the example implementations disclosed herein, one or more devices, components, entities, or functionalities of the network architecture 200 may support a cell-by-cell resource prediction of a requested network slice in accordance with an SLA associated with the requested network slice and, in some implementations, observed network conditions at each cell or across various groups of cells of a set of cells within an envisioned slice coverage area. In accordance with obtaining the cell-by-cell resource prediction, the cell-by-cell resource prediction may be stored and added on top of a current (actual) resource utilization at each of the cells within the envisioned slice coverage area. A scanning operation may indicate which cells or which group of cells within the envisioned slice coverage area are able to accommodate a respective predicted resource allocation in addition to a respective current cell load. In accordance with (such as with reference to) a slice admission policy, the requested network slice may be approved for admission or rejected in accordance with how many (such as what percentage of) cells are able to accommodate the requested network slice, how many (such as what percentage of) intended users are able to be served in accordance with the requested network slice, or both.

Figure 3:
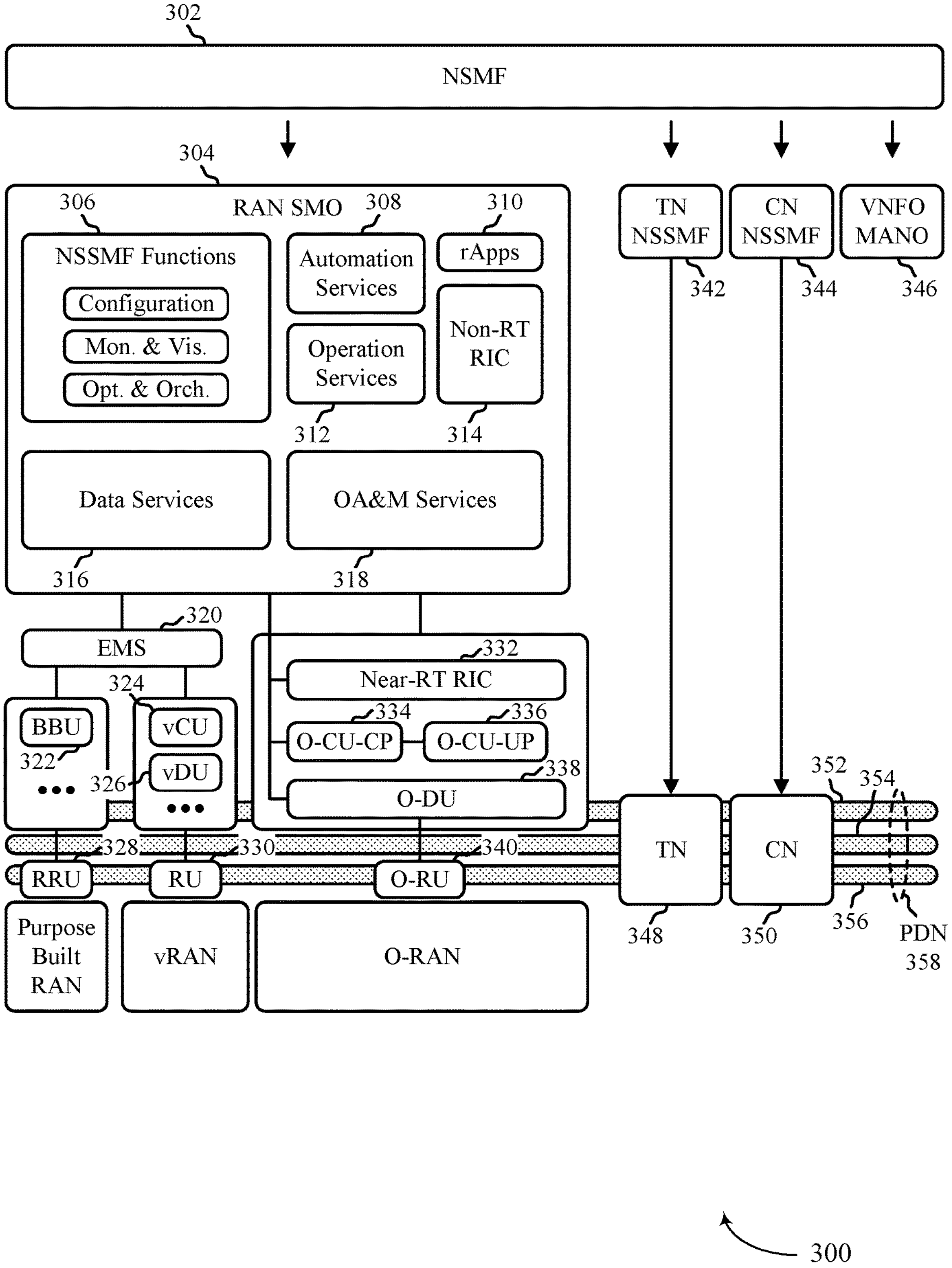

FIG. 3 shows an example network architecture 300 that supports network slice feasibility assessment for slice orchestration in a wireless network. The network architecture 300, which may illustrate a RAN NSSMF architecture, may be associated with end-to-end (E2E) management and orchestration of network slicing. For example, the network architecture 300 may be associated with 5G standalone (SA) slicing E2E management and orchestration, and may support network slicing in different types of RAN deployments, including O-RAN and non-O-RAN deployments.

The network architecture 300 may include or be supported by various devices, components, entities, or functionalities, including an NSMF 302 and an SMO 304 (which may interface with one or more open APIs). The SMO 304 may include one or more NSSMF functions 306. An NSSMF (which may be understood as a RAN NSSMF, or R-NSSMF) may include or be associated with vendor agnostic automated slice design, creation, monitoring, and optimization. The NSSMF may have a "northbound" interface towards the NSMF 302. The NSSMF functions 306 may include a slice configuration function, a slice monitoring and visualization function (abbreviated Mon. & Vis. in the example illustration of FIG. 3), and a slice optimization and orchestration function (abbreviated Opt. & Orch. in the example illustration of FIG. 3).

The NSSMF functions 306 may further be associated with a slice manager, which may perform operations associated with an integrity service and a monitoring service. For example, the slice manager may propagate slice states to the NSMF 302, expose slicing APIs (such as to create, modify, or deactivate), and instantiate integrity service upon slice configuration. An integrity service may support a short cycle integrity check (in accordance with augmented cell data), a live network tracker (in accordance with observing whether cells within a slice were changed), and a long cycle integrity check (in accordance with daily slice policy enforcement). A monitoring service may keep track of an activated slice SLA and, if an SLA is not met, raise (such as trigger) an event to be treated by a suitable application.

A slice configuration function may include or be associated with automated new slice configuration and existing slice reconfiguration for multiple virtualized RAN (vRAN) vendors' gNB over a traditional or vRAN element management system (EMS), or over an O1 interface in examples of open RAN (O-RAN) deployments. A slice monitoring and visualization function may include or be associated with monitoring slice SLA key performance indicators (KPIs) according to slice profile attributes (such as throughput, delay, reliability, availability, mobility, activity, or traffic) on a cell or cluster level. In scenarios of predicted violation, the slice monitoring and visualization function may trigger a slice optimization. A slice optimization and orchestration function may include or be associated with event trigger context-based closed-loop optimization for a relevant cell or cluster and resolving SLA violations generated by an SLA monitoring service.

The SMO 304 may further include or be associated with automation services 308, RAN apps (rApps) 310 (which may include a slice feasibility rApp, a configuration rApp, or a generic n rApp), operation services 312, a non-real time (RT) RAN intelligent controller (RIC) 314, data services 316, and operations, administration, and maintenance (OA&M) services 318. The SMO 304 may further be associated with one or more operational policies, a recipe service, and a contextual service. The data services 316 and the OA&M services 318 may collectively include or be associated with (such as have exposure to via an API) RAN data exposure, RAN data abstraction, a provisioning gateway, an inventory, a network manager, a network function orchestrator (NFO) interoperability (which may be associated with an NFO component to which the SMO 304 may have exposure via an API), performance management (PM), configuration management (CM), fault management (FM), and trace management. The SMO 304 may include an API gateway or a message bus via which one or more rApps 310 and other services of the SMO 304 (such as the NSSMF functions 306 and the non-RT RIC 314) may communicate.

The SMO 304 may communicate with an EMS 320, which may be associated with two different branches including a first branch associated with a purpose built RAN and a second branch associated with a vRAN. The first branch may be associated with a baseband unit (BBU) 322 and potentially additional hardware coupled with a remote radio unit (RRU) 328. The RRU 328 may provide access to the purpose built RAN, which may be associated with 3G through to 5G deployments and beyond. The second branch may be associated with a virtualized CU (vCU) 324 and a virtualized DU (vDU) 326 and potentially additional hardware coupled with a radio unit (RU) 330. The RU 330 may provide access to the vRAN, which may be associated with 4G, 5G and 6G deployments.

The SMO 304 may further communicate with one or more O-RAN network functions including a near-RT RIC 332, an O-RAN CU control plan (O-CU-CP) 334, an O-RAN CU user plane (O-CU-UP) 336, and an O-RAN DU (O-DU) 338. The O-RAN network functions may communicate with an O-RAN RU (O-RU) 340 which may provide access to the O-RAN, which may alternatively be referred to or understood as an open cloud (O-Cloud), and which may be associated with 4G, 5G and 6G deployments. In some aspects, the SMO 304 may interface with the near-RT RIC 332, the O-CU-CP 334, and the O-DU via an O1 interface. Additionally, or alternatively, the SMO 304 may interface with the near-RT RIC 332 via an A1 interface. The near-RT RIC 332 may interface with each of the O-CU-CP 334 and the O-CU-UP 336 via E2 interfaces, and the O-CU-CP 334 may interface with the O-CU-UP 336 via an E1 interface. The O-CU-CP 334 may interface with the O-DU 338 via either or both of an E2 interface or an F1-C interface, and the O-CU-UP may interface with the O-DU 338 via an F1-U interface. The O-DU 338 may interface with the O-RU 340 via an open fronthaul.

The network architecture 300 may further be associated with a transport network (TN) NSSMF 342 interfacing or otherwise associated with a TN 348 (for fronthaul, midhaul, and backhaul communication) and a core network (CN) NSSMF 344 interfacing or otherwise associated with a CN 350 (for user plane function (UPF) and session management function (SMF) communication). The network architecture 300 may further be associated with a virtualized network function orchestration (VNFO) management and orchestration (MANO) 346. In some aspects, the network architecture 300 may support one or more types of network slices, including a massive machine type communication (mMTC) slice 352, an enhanced mobile broadband (eMBB) slice 354, and a URLLC or vehicle to everything (V2X) slice 356, each of which may be associated with a packet data network 358.

In some deployment scenarios, several challenges associated with RAN slicing by an MNO may arise. For example, RAN slicing and configuring multiple slice types deployed across multiple RAN vendors and frameworks (such as traditional RAN frameworks, vRAN frameworks, and O-RAN frameworks) may introduce high complexity. Further, a slice configuration process in various geographical areas, in various multi-band or multi-frequency deployments, using different slice parameters, and supporting a high degree of slice customization may add to such complexity and may further contribute meaningfully to a latency in a determination of slice feasibility. Additionally, monitoring, managing, or supporting slice SLA fulfillment in a multi-slice environment may introduce further complexities as networks plan to support a relatively large quantity of slices (such as a maximal quantity of slices possible).

Further, challenges may arise in association with an expectation for approval of a slice request sent by the NSMF 302 (an E2E orchestrator). The slice request can be of different types, including eMBB, URLLC, or mMTC and each could have different SLA constraints. Once a request is made, a RAN NSSMF (which may be a RAN domain orchestrator), may determine, measure, identify, or ascertain whether there is enough capacity, coverage, and resources in an envisioned slice coverage area. Due to high variability, such a determination of whether there is enough capacity, coverage, and resources may suffer from significant performance degradation if not executed in a cell-by-cell manner. Further, the expected deployment scenario of such network slice requests is on-demand and dynamic, as the NSMF 302 may often send random requests to the NSSMF for new slice creation.

In some implementations, to address such challenges associated with RAN slicing, one or more devices, components, entities, or functions associated with the network architecture 300 may support an automated slice configuration process that leverages an ML/AI model to assist in slice feasibility determination. As part of such an automated slice configuration process, a new slice allocation request may be made by the NSMF 302 to the NSSMF, which may determine whether there are enough resources to accommodate the new slice allocation request (an eMBB slice allocation request). For example, the SMO 304, or a device that performs operations associated with the SMO 304 or the NSSMF, may receive a request for a network slice from the NSMF 302 and may trigger a series of applications (such as a series of rApps 310) to determine whether the requested network slice is feasible, and may output a recommendation associated with (such as an approval or rejection of) the requested network slice. In some aspects, such a series of applications may include a resource estimation application and a feasibility application, and the feasibility application may account for various inputs including an output of the ML/AI model (which may provide insight or information otherwise assistive to a determination of whether the requested network slice is to be approved or rejected). In accordance with determining whether the requested network slice is to be approved or rejected, the SMO 304 may output an indication of the approval or the rejection toward the NSMF 302 (such as via the NSSMF).

Figure 4:
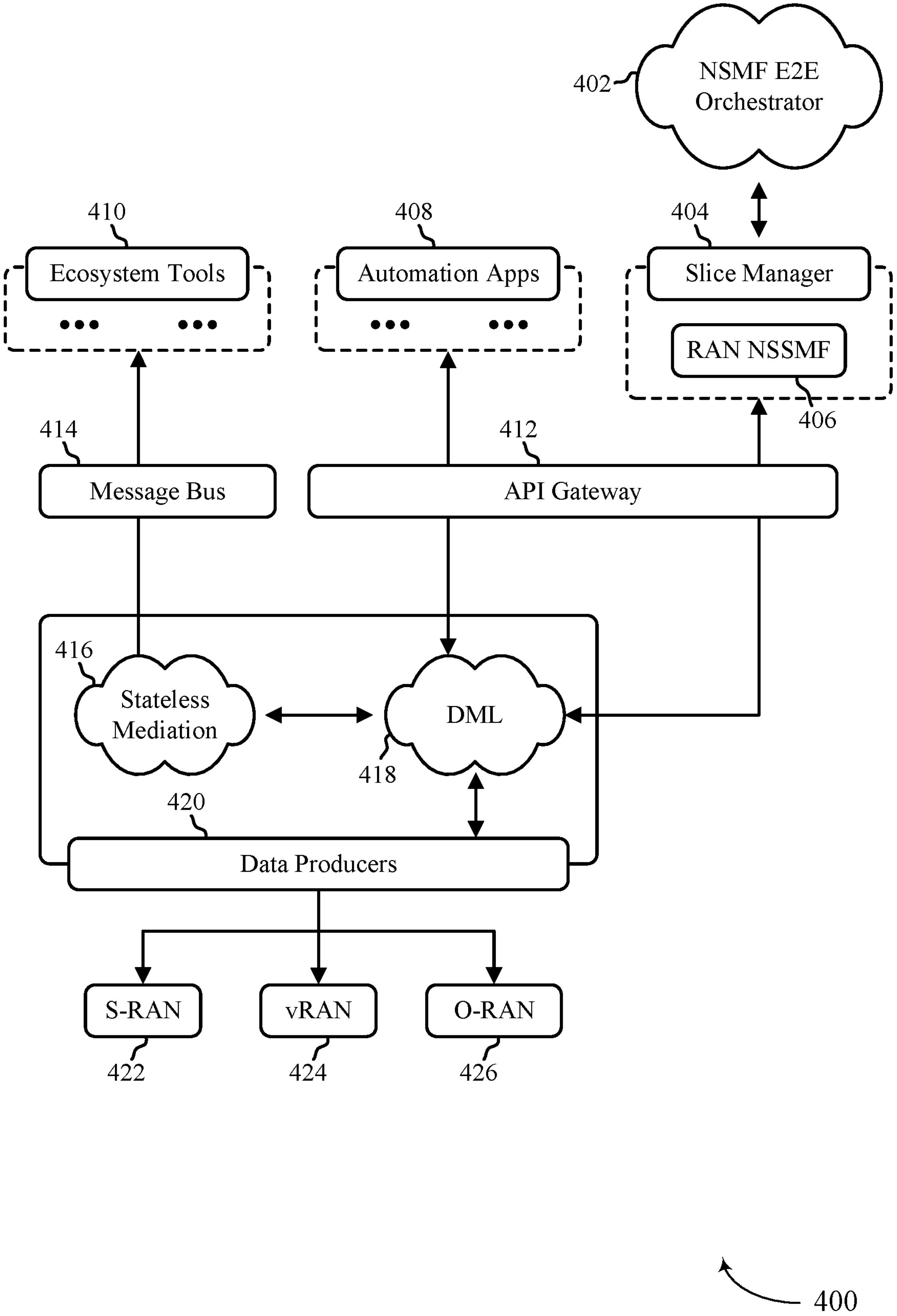
FIG. 4 shows an example network framework that supports network slice feasibility assessment for slice orchestration in a wireless network.

FIG. 4 shows an example network framework 400 that supports network slice feasibility assessment for slice orchestration in a wireless network. The network framework 400 illustrates slicing applications on top of a data mediation layer (DML) to execute NSMF slice orders. The network framework 400 may include an NSMF E2E orchestrator 402 that communicates with a slice manager 404, which may include, be included within, or otherwise be associated with an NSSMF 406. The network framework 400 may further include a set of automation applications 408 (such as one or more automation applications 408) and a set of ecosystem tools 410 (such as one or more ecosystem tools 410).

The slice manager 404 (or the NSSMF 406) may communicate with a DML 418 via an API gateway 412. Similarly, the automation applications 408 may communicate with the DML 418 via the API gateway 412. The ecosystem tools 410 may communicate with a stateless mediation 416 via a message bus 414. The stateless mediation 416 and the DML 418 may communicate in accordance with a network deployment, and the DML 418 may communicate with one or more data producers 420. The data producers 420 may provision data to one or multiple different types of networks, including a single RAN (S-RAN) 422, a vRAN 424, or an O-RAN 426.

In some implementations, the network framework 400, or devices or components associated with the network framework 400, may be pluggable, scalable, abstractable, programmable, and compatible, which may facilitate realization of the example implementations of the present disclosure. For example, various devices, components, entities, functionalities, or applications associated with the network framework 400 may support an automated slice configuration process according to which a device associated with an SMO may receive a request for a network slice and output a recommendation associated with the requested network slice in accordance with ML/AI-assisted cell-by-cell resource allocation predictions for the requested network slice and a current cell load across the cells within an envisioned slice coverage area.

Figure 5:
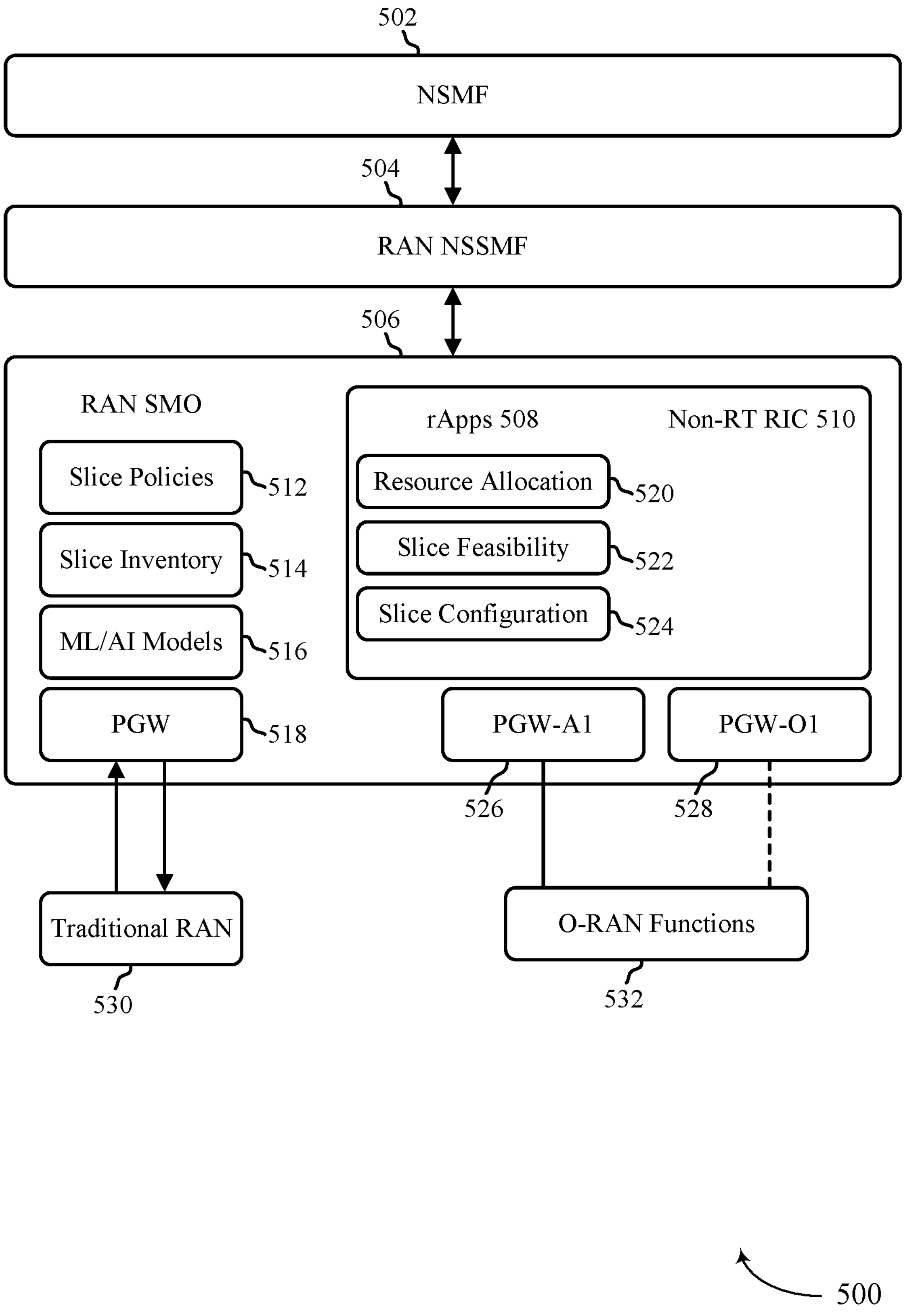
FIG. 5 shows an example network architecture that supports network slice feasibility assessment for slice orchestration in a wireless network.

FIG. 5 shows an example network architecture 500 that supports network slice feasibility assessment for slice orchestration in a wireless network. The network architecture 500 includes an NSMF 502, a NSSMF 504 (which may be understood as a RAN NSSMF, or R-NSSMF), and an SMO 506 (which may be understood as a RAN SMO). The NSMF 502 may interface with the NSSMF 504, which may in turn interface with the SMO 506. In some implementations, the network architecture 500 may illustrate a functional diagram via which a device associated with service management may perform the example implementations disclosed herein.

The SMO 506 may include or be associated with a set of (such as one or more) rApps 508 and a non-RT RIC 510. The rApps 508 may include at least a resource allocation application 520 (which may be understood or otherwise referred to as a resource estimation application), a slice feasibility application 522, and a slice configuration application 524. The SMO 506 may further include or be associated with various other services, functions, or entities, and such various other services, functions, or entities may include slice policies 512, a slice inventory 514, ML/AI models 516, and a packet gateway (PGW) 518. In some aspects, the SMO 506 may further include or be associated with a PGW-A1 526 (a PGW associated with an A1 interface) and a PGW-O1 528 (a PGW associated with an O1 interface). The SMO 506 may interface with a traditional RAN 530 via the PGW 518 and may interface with one or more O-RAN functions 532 via one or both of the PGW-A1 526 or the PGW-O1. The traditional RAN 530 may be associated with an EMS 320 as illustrated by and described with reference to FIG. 3, and may refer to one or more of a purpose built RAN, an S-RAN, or a vRAN. The O-RAN functions 532 may include any one or more of an near-RT RIC 332, an O-CU-CP 334, an O-CU-UP 336, and an O-DU 338 as illustrated by and described with reference to FIG. 3.

In some implementations, one or more devices, components, entities, or functions associated with the network architecture 500 may support or otherwise facilitate an automated slice configuration process according to which a recommendation associated with a requested network slice may be provided in an on-demand manner. For example, a device associated with service management of a wireless network (such as a device housing or otherwise associated with a functionality of one or both of the NSSMF 504 or the SMO 506) may output a recommendation associated with a requested network slice in accordance with one or more of an SLA associated with the requested network slice, observed network conditions, current cell loads, a traffic forecast, or a slice admission policy, among other examples. In some implementations, the device associated with the service management may use one or more ML/AI models 516 to assist in a predicted resource allocation of the requested network slice on a cell-by-cell basis or to assist with an outputting of (such as a determination of) the recommendation, such one or more ML/AI models 516 being trained in accordance with observed network conditions, a set of (such as one or more) network snapshots, live network statistics, or any combination thereof.

For example, the device may train an ML/AI model 516 in accordance with different types of networks with different types of cells. In the training, each cell may be associated with (such as hold) a unique RF distribution pattern and different cell physical data (such as different cell physical characteristics, which may include a cell height, a sight distance, a distance between cell sites, or an antenna configuration). Additionally, or alternatively, the device may train the ML/AI model 516 considering different slice natures, a slice nature corresponding to, for example, indoor stationary, outdoor stationary, indoor-outdoor mix stationary (according to which there may be some distribution of indoor devices and outdoor devices), or V2X moving/mobile located on roads. In accordance with such training, the device may achieve more accurate cell modeling (which may be used as a baseline to calculate predicted PRB allocations for a requested network slice). Additionally, or alternatively, the device may train the ML/AI model 516 using different bands and frequencies, different morphologies, and different types of SLA requests (coming from the NSMF 502). As such, the ML/AI engine may use (such as consider or reference) different bands and frequencies and different morphologies when selecting or otherwise determining an approval or a rejection of a requested network slice.

In accordance with some implementations, the device associated with the service management may perform a series of operations or trigger a series of applications, or any combination thereof, in response to receiving a request for a network slice. For example, the NSMF 502 may indicate (such as output or transmit) a request for a network slice to the NSSMF 504. The request may include or be associated with an SLA of the requested network slice. For example, the request may indicate one or more parameters associated with the SLA of the requested network slice. Such one or more parameters may be indicative of a throughput expectation, a latency constraint, a bit error rate, or a quantity of intended users at each cell in an envisioned slice coverage area. Additionally, in some examples, the one or more parameters may be indicative of a slice admission policy, such as an MNO slice admission policy. In some aspects, a throughput expectation may be associated with a guaranteed bit rate, which may be understood as a slice request minimum (downlink) throughput.

A requested network slice may be a new network slice or a modified version of an existing network slice. Further, a requested network slice may be any type of network slice, such as any type of eMBB network slice. A target or expected throughput may be associated with or defined by a quantity of bits per second. For example, a throughput expectation of a requested network slice may include 10 megabits per second (Mbps), 20 Mbps, 40 Mbps, or 100 Mbps, among other examples. As such, a requested network slice may be understood as an eMBB 10 Mbps slice request, an eMBB 20 Mbps slice request, an eMBB 40 Mbps slice request, an eMBB 100 Mbps slice request, among other examples.

The NSSMF 504 may, in accordance with receiving the request, trigger the resource allocation application 520 in the SMO 506. In some implementations, the resource allocation application 520 may provide a cell-by-cell resource estimation in accordance with the SLA of the requested network slice. In some aspects, the resource allocation application 520 may employ (such as use) per cell planning, which may be understood as cell planning on a cell-by-cell basis. For example, the resource allocation application 520 may determine (such as identify, select, predict, or calculate) a spectrum portion (in terms of, for example, PRBs) that will likely satisfy the requested SLA in accordance with RF conditions (such as observed network conditions) at each of a set of cells within the envisioned slice coverage area. In other words, the resource allocation application 520 may provide a PRB estimation in accordance with traffic model analytics.

Accordingly, the resource allocation application 520 (which may be understood or otherwise referred to as a resource estimation application) may estimate a load (in terms of communication resources, such as PRBs) that the requested network slice might consume to allow its implementation. In other words, the resource allocation application 520 may be associated with an ability or capability to predict a quantity of PRBs per cell or per group of cells for a requested SLA for different types of network slice requests, such as different types of network slice requests of slice/service type (SST)=eMBB type. Such an eMBB type of slice may be associated with a guaranteed bit rate (such as throughput), such as 10 Mbps, 20 Mbps, 40 Mbps, or 100 Mbps, among other examples.

In some implementations, the resource allocation application 520 may allow a user to adjust one or more evaluation thresholds to network-specific performance and the resource allocation application 520 may include, be associated with, or otherwise have access to (such as via a wired or wireless interface) backlog data for calculation. Such evaluation thresholds, which may be understood as optimization parameters and may be associated with a slice admission policy, may include a backlog duration, a percentile threshold for RF measurement distribution, a minimum quantity of RF measurement samples, an allowed frequency list, a busy hour definition, or any combination thereof. In other words, an MNO may be asked, by the device associated with service management, information indicative of a user coverage percentile (such as percentage of users to be covered, which may relate to a threshold quantity of intended users), a percentile of cells out of the slice coverage area (such as a percentage of cells that are outside of the slice coverage area, which may relate to a threshold quantity of cells), and a safety margin definition associated with violating the slice (such as a maximum PRB utilization which is defined for a cell and compared against the allocated cell utilization (such as the actual measured utilization of the cell) and the predicted utilization of the new slice).

In accordance with such cell-by-cell resource estimation, the resource allocation application 520 may select or predict that a first cell (or each cell of a first group of cells) associated with relatively higher quality RF conditions may likely use a first, smaller quantity of PRBs to suitably support the requested network slice and that a second cell (or each cell of a second group of cells) associated with relatively poorer quality RF conditions may likely use a second, larger quantity of PRBs to suitably support the requested network slice. Additional details relating to such a variation in RF conditions across cells within an envisioned slice coverage area, and corresponding variations in PRB estimation, are illustrated by and described with reference to FIG. 6.

In some implementations, the SMO 506 may use a resource allocation ML/AI engine (such as one of more of the ML/AI models 516) to support the cell-by-cell resource estimation for the requested network slice. In accordance with using such an ML/AI engine, the SMO 506 may input one or more parameters into the ML/AI engine and obtain, as an output of the ML/AI engine, estimated PRB allocations on a cell-by-cell basis. Such one or more parameters that the SMO 506 may input into the ML/AI engine may include a first set of one or more parameters associated with (such as that contribute to) per cell modeling and a second set of one or more parameters associated with the requested SLA. The first set of parameters associated with per cell modeling may include parameters associated with RF conditions or parameters associated with PRB and load distributions, or both. For example, cell modeling may be associated with one or more of a frequency band, a duplexing mode (such as FDD or TDD), traffic behavior (such as indoor stationary, outdoor stationary, indoor-outdoor mix stationary, or V2X moving/mobile located on roads), an MCS, an RI, and a cell RF profile using various metrics such as channel quality indicator (CQI) statistics. As such, in some implementations, an MNO may be asked, by the device associated with service management, for inputs including band or frequency, traffic distribution (such as what percentage of intended users are indoors and what percentage of intended users are outdoor), and one or more RF profiles built in accordance with CQI.

The second set of parameters associated with the requested SLA may include a quantity of active and scheduled users per cell/per slice, a target bit error rate, slice profile throughput and latency targets, or any combination thereof. The output of the ML/AI engine may include a quantity of PRBs per cell or per group of cells for a requested network slice (or for multiple requested network slices). As such, there may be a delta PRB per cell, such that, at a given cell, a first network slice may be allocated a first quantity of PRBs, a second network slice may be allocated a second quantity of PRBs, and a third network slice may be allocated a third quantity of PRBs.

In some aspects, the described cell-by-cell resource estimation techniques may support a relatively more accurate estimation of per cell PRB allocation. For example, in some other systems, an operator may use a single PRB allocation value for all cells, which may result in over-dimensioning or under-dimensioning of the spectrum. Over-dimensioning of the spectrum (which may be equivalently understood as resource over-estimation) may result in or otherwise increase the likelihood of spectrum loss or waste. In other words, over-dimensioning may generate false negatives (in terms of whether cells are able to accommodate a requested network slice), leading to network sub-utilization.

Under-dimensioning of the spectrum (which may be equivalently understood as resource under-estimation) may result in or otherwise increase the likelihood of an SLA violation. In other words, under-dimensioning may generate false positives (in terms of whether cells are able to accommodate a requested network slice) in cells that may avoid (or otherwise be unable to guarantee) slice SLA fulfillment. For example, with under-dimensioning, an operator may violate an SLA to customers in some conditions (such as under relatively high load conditions). As such, in accordance with the described cell-by-cell resource estimation techniques, the system may avoid spectrum loss while also avoiding enterprise or customer slice violations, while also addressing complexities associated with selection of resource allocation settings in terms of isolation level (such as dedicated, prioritized, or shared).

The SMO 506 may obtain the cell-by-cell resource estimation of the requested network slice, which may be understood or referred to as a respective PRB allocation of the network slice for each cell of a set of cells, as an output of the resource allocation application 520. In accordance with obtaining the cell-by-cell resource estimation, the SMO 506 may save the data associated with the cell-by-cell resource estimation in a database and trigger a slice feasibility check via the slice feasibility application 522. The slice feasibility application 522 may take a set of inputs and may output a recommendation associated with the requested network slice. In some implementations, the slice feasibility application 522 may output the recommendation associated with the requested network slice in accordance with the cell-by-cell resource estimation and a current cell-by-cell resource utilization, among other factors (such as traffic forecasting, a slice admission policy, and performance metrics, among other examples).

In other words, for each of a set of cells within the envisioned slice coverage area, the slice feasibility application 522 may add a respective predicted PRB allocation to a respective current PRB utilization to calculate (such as determine or predict) a total quantity of PRBs that might be used (to support existing network slices and the requested network slice) at that cell. In accordance with the calculation of the total quantity of PRBs that might be used at each cell of the set of cells within the envisioned slice coverage area, the slice feasibility application 522 may scan across the set of cells, apply a slice admission policy, and output an approval or rejection of the requested network slice in accordance with the scan and the slice admission policy.

Additionally, or alternatively, an approval or rejection of a requested network slice may be in accordance with a subset of cells of a larger set of cells if not in accordance with all input cells. For example, one or both of the resource allocation application 520 and the slice feasibility application 522 may take (such as receive, select, obtain, or otherwise determine) a quantity m of cells as inputs (such as inputs to, for example, train a machine learning model or as inputs to resource allocation and feasibility check, or as inputs to both) and may output a decision on a quantity n of the m cells ($n \leq m$, including examples in which $n=1$). Such an inputting of a first quantity m of cells and a providing of a decision (such as a recommendation, which may include an approval or a rejection) associated with a second quantity n of cells may be implemented in addition to, or as an alternative to, exact (such as 1:1) cell-by-cell processing. In other words, cell-by-cell resource estimation may include cell-by-cell resource estimation when an output number (such as n) of cells is a subset of an input number (such as m) of cells (such that $n<m$) or when the output number (such as n) of cells is equal to an input number (such as m) of cells (such that $n=m$). Generally, scenarios in which $n=m$ may be understood as exact (such as 1:1) cell-by-cell processing, as a decision is provided for all of the input cells.

Such a decision for a subset of cells may relate to a recommendation associated with the requested network slice that is applicable to the subset of cells. In outputting a final recommendation associated with a requested network slice, the slice feasibility application 522 may consider (such as account for) one or more recommendations associated with cell-by-cell processing, one or more recommendations associated with processing one or more subsets of cells, or any combination thereof. Different subsets of cells, in examples in which cell-by-cell resource estimation is such that $n<m$, may include a same quantity of cells or may include different quantities of cells.

In some implementations, the slice feasibility application 522 may take, as an input, an output of an ML/AI model (such as one or more of the ML/AI models 516) that provides ML/AI augmented insights associated with whether the requested network slice is to be approved or rejected. In such implementations, the output of the ML/AI model may be associated with an auto-classification or a KPI prediction, or both. Additional details relating to the various inputs into the slice feasibility application 522 are illustrated by and described with reference to FIG. 7.

The SMO 506 may output or otherwise provide an indication of the approval or the rejection of the requested network slice to the NSSMF 504. In examples in which the SMO 506 outputs an approval of the requested network slice (in accordance with the output of the slice feasibility application 522), the NSSMF 504 may deploy the requested network slice in a network slice subnet instance (NSSI), such as an existing NSSI. The NSSMF 504 may trigger the slice configuration application 524 in accordance with the approval of the requested network slice and the SMO 506 may provision the requested network slice accordingly. In association with the provisioning of the requested network slice, the NSSMF 504 may notify the NSMF 502 that the requested network slice was configured successfully. Alternatively, in examples in which the SMO 506 outputs a rejection of the requested network slice, the NSSMF 504 may notify the NSMF 502 that the requested network slice was rejected (and not configured). Upon notification, the NSMF 502 may transmit another request for another network slice. For example, the NSMF 502, the NSSMF 504, and the SMO 506 may iteratively and dynamically request and analyze multiple network slices (such as multiple SLAs) over time, which may satisfy one or more user expectations related to network responsiveness to network slice requests. Further, in accordance with the described techniques, the device associated with service management may support on-demand prediction of a quantity of PRBs for different types of cells using feasibility cell modeling for any type of slice eMBB (which may be associated with a guaranteed throughput) SLA.

In accordance with deployment of the requested network slice in a wireless network (such as after approval or admission), an ML/AI model (of the ML/AI models 516) associated with outputting the recommendation associated with the requested network slice may learn (such as in accordance with receiving indications of) live network statistics, which the ML/AI model may use to increase an accuracy of the ML/AI model for a next network slice request. In some implementations, a device associated with service management may receive information indicative of one or more performance indicators (such as KPIs) associated with the deployed network slice and may update (such as refine or retrain) the ML/AI model in accordance with the performance indicator(s). For example, the device may receive information indicative of an actual PRB usage at each of a set of cells within a slice coverage area, compare the actual PRB usage with the predicted PRB usage, and update (such as refine or retrain) the ML/AI model in accordance with a delta between the actual PRB usage and the predicted PRB usage.

Figure 6:
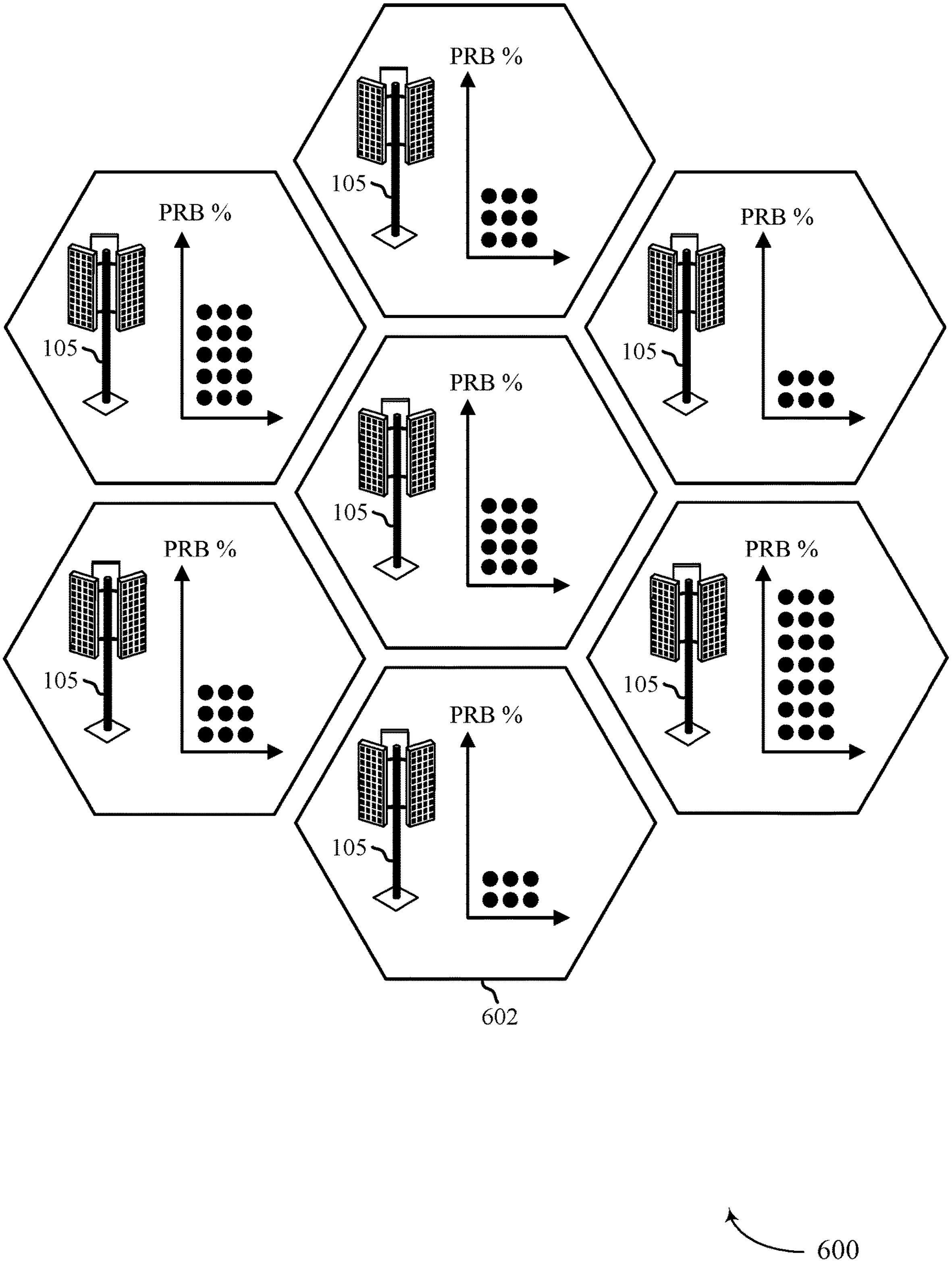
FIG. 6 shows an example slice coverage area that supports network slice feasibility assessment for slice orchestration in a wireless network.

FIG. 6 shows an example slice coverage area 600 that supports network slice feasibility assessment for slice orchestration in a wireless network. The slice coverage area 600 may include a set of cells and, in accordance with the example implementations disclosed herein, a resource allocation application 520 of an SMO 506 may select (such as determine or predict) a respective PRB allocation of a requested network slice for each cell of the set of cells in accordance with an SLA of the requested network slice. In some further implementations, the resource allocation application 520 may select (such as determine or predict) a respective PRB allocation of the requested network slice for each cell of the set of cells in accordance with the SLA and observed network conditions (such as observed network conditions at each of the set of cells).

For example, each cell of the set of cells may be associated with potentially unique network conditions (such as RF conditions), along with other unique factors or characteristics, and the resource allocation application 520 may account for such variability across the set of cells to select (such as determine or predict) a respective PRB allocation of the requested network slice for each cell of the set of cells. In other words, the resource allocation application 520 may recognize or otherwise consider that, to support a given throughput per cell, different sized spectrum portions may be used if RF conditions differ. For example, if a first cell (or a first group of cells) is associated with relatively high quality RF conditions, the first cell (or the first group of cells) may use a relatively smaller quantity of PRBs to meet (such as satisfy) a given SLA, which may inform the resource allocation application 520 to allocate the relatively smaller quantity of PRBs to the first cell (or the first group of cells) for the given SLA. For further example, if a second cell (or a second group of cells) is associated with relatively low quality RF conditions, the second cell (or the second group of cells) may use a relatively larger quantity of PRBs to meet (such as satisfy) the given SLA, which may inform the resource allocation application 520 to allocate the relatively larger quantity of PRBs to the second cell (or the second group of cells) for the given SLA.

Further, different cells within the slice coverage area 600 may be associated with different loads (in terms of a percentage of PRBs of available PRBs currently being used) or different signal-to-interference plus noise ratio (SINR) values, or both. For example, some cells may be associated with relatively high loads and relatively low SINR values, some cells may be associated with relatively low loads and relatively low SINR values, some cells may be associated with relatively high loads and relatively medium (such as average) SINR values, some cells may be associated with relatively medium (such as average) loads and relatively medium SINR values, some cells may be associated with relatively medium loads and relatively high SINR values, some cells may be associated with relatively low loads and relatively high SINR values, or any combination thereof. In accordance with the example implementations of the present disclosure, the resource allocation application 520 may determine (such as select, calculate, or predict) cell-by-cell resource estimations of a requested network slice by considering or otherwise using such observed network conditions at each of the cells within the slice coverage area 600. In some aspects, the resource allocation application 520 may determine (such as select, calculate, or predict) the cell-by-cell resource estimations in accordance with cell-specific models, such as models being associated with (such as constructed in accordance with) the observed network conditions.

In the example of the slice coverage area 600, cells within the slice coverage area 600 are illustrated as network entities 105, although it is within the scope of the present disclosure that multiple cells may be located at a same network entity 105. As such, a cell within the slice coverage area 600 may at least include or be associated with a network entities 105. Likewise, a per cell resource allocation (such as a per cell PRB allocation) may be understood as a per network entity 105 resource allocation (such as a per network entity 105 PRB allocation). Each cell may be associated with a respective coverage area 602, which may encompass or serve one or more intended users associated with the requested network slice. In some aspects, a coverage area 602 may be an example of a coverage area 110 as illustrated by and described with reference to FIG. 1.

Figure 7:
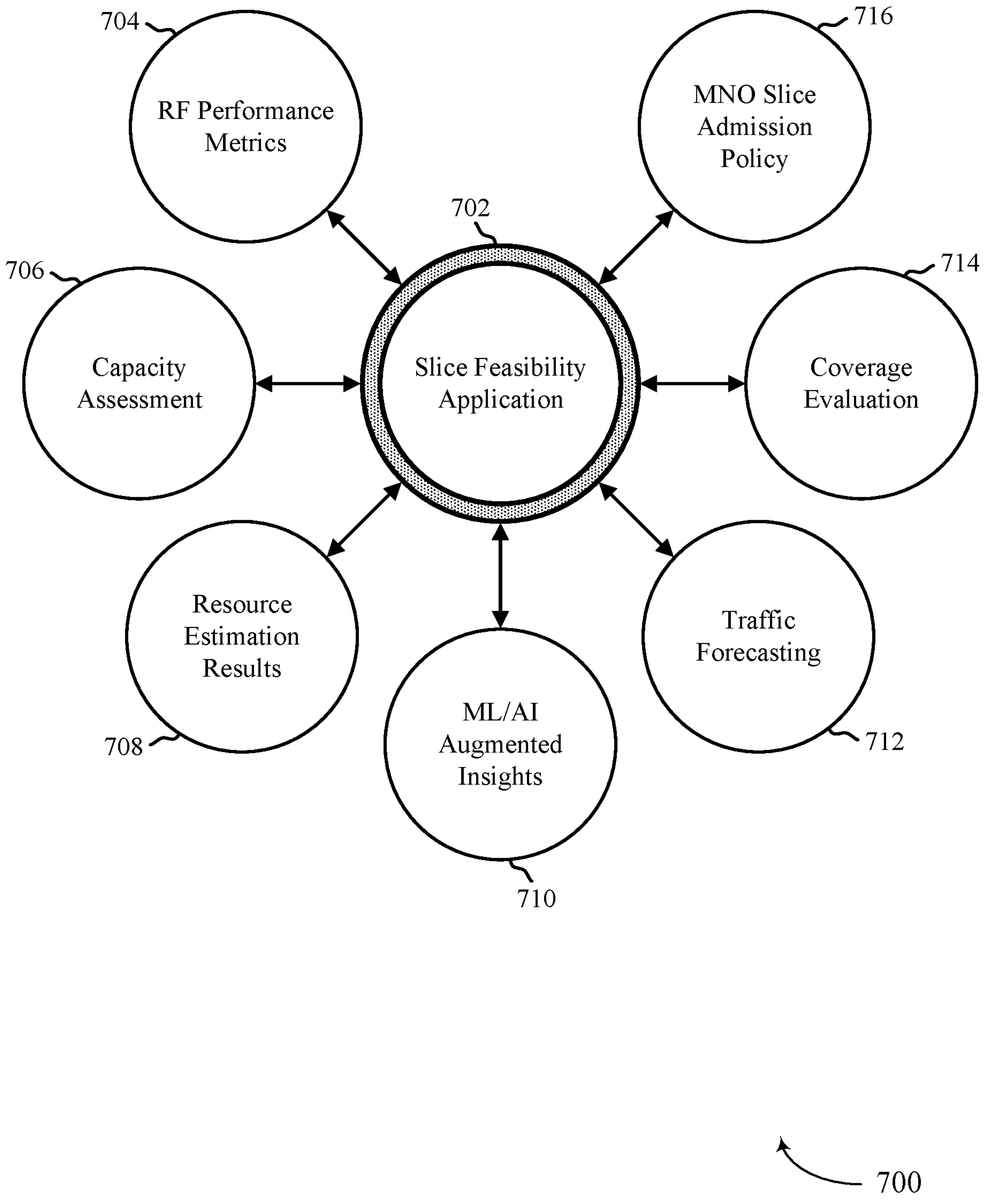
FIG. 7 shows an example slice feasibility analysis that supports network slice feasibility assessment for slice orchestration in a wireless network.

FIG. 7 shows an example slice feasibility analysis 700 that supports network slice feasibility assessment for slice orchestration in a wireless network. A slice feasibility application 702 may perform the slice feasibility analysis 700, and the slice feasibility application 702 may be an example of the slice feasibility application 522 as illustrated by and described with reference to FIG. 5. In some implementations, the slice feasibility application 702 may provide accurate resource calculation and forecasting as part of slice assurance and, in accordance with the resource calculation and forecasting, may output a recommendation associated with a requested network slice. Such a recommendation associated with a requested network slice may include a slice approval or a slice rejection.

In accordance with the slice feasibility analysis 700, the slice feasibility application 702 may take a set of inputs and may output a recommendation associated with a requested network slice in accordance with the set of inputs. Such inputs may include a set of RF performance metrics 704, input from a capacity assessment 706, resource estimation results 708 (which may be an output of the resource allocation application 520), ML/AI augmented insights 710, traffic forecasting 712, input from a coverage evaluation 714, and an MNO slice admission policy 716. Additionally, or alternatively, the slice feasibility application 702 may provide a decision on whether the requested network slice can be admitted assuming inputs of SLA, one or more counters associated with a set of cells (such as counters associated with PRBs or CQI), and a morphology associated with the set of cells (such as whether the set of cells, or the envisioned slice coverage area, is associated with an urban deployment or a rural deployment).

In accordance with such inputs, including by accurately forecasting PRB utilization over each cell in accordance with cell-specific or group of cells-specific conditions, the slice feasibility application 702 may provide a recommendation associated with a requested network slice with relatively higher reliability (such as with high certainty that slice performance will not be adversely impacted if launched, such as if approved). As such, the output of the slice feasibility application 702 (the recommendation associated with the requested network slice) may be understood as an acknowledgment of the network's capacity and coverage. In other words, the slice feasibility application 702 may employ or otherwise determine load feasibility to allow, enable, or otherwise facilitate evaluation of network capability to support a requested network slice. For example, the slice feasibility application 702 may evaluate a current load with the estimated load (such as with the resource estimation results 708), potentially along with a forecasted cell load at some point in the future (such as six months or 12 months in the future), to predict if the network can support the requested network slice.

In some implementations, the slice feasibility application 702 may be associated with or part of an ML/AI model (such as a neural network or a reinforcement learning model) with supervised learning (to support classification ML at the slice feasibility application 702). In such implementations, the ML/AI model may be trained (using supervised learning) by learning examples associated with various different simulations (such as examples associated with various different network snapshots). For example, a device associated with service management or a user may provide, as a training set for the ML/AI model, a set of network snapshots, each network snapshot corresponding (such as mapping) a suitable PRB allocation to a requested network slice and being associated with a unique permutation of one or more cell types, one or more cluster sizes, one or more cell physical characteristics, one or more cell load conditions, or one or more cell channel quality distributions, one or more interference levels, or any combination thereof.

In some implementations, the slice feasibility application 702 may allow or enable a user to adjust one or more evaluation thresholds to network-specific performance. Such evaluation thresholds, which may be understood as optimization parameters and may be associated with a slice admission policy, may include a backlog duration, a maximum allowed percentage of total PRB utilization per cell, a maximum allowed percentage of measured PRB utilization per cell, an overall allowed slice implementation threshold, or any combination thereof. For example, the slice feasibility application 702 may output an approval of a requested network slice if greater than or equal to a threshold quantity (such as a threshold percentage) of cells are able to accommodate the requested network slice or if greater than or equal to a threshold quantity (such as a threshold percentage) of intended users are served by cells that are able to accommodate the requested network slice. Alternatively, the slice feasibility application 702 may output a rejection of a requested network slice if less than to a threshold quantity (such as a threshold percentage) of cells are able to accommodate the requested network slice or if less than to a threshold quantity (such as a threshold percentage) of intended users are served by cells that are able to accommodate the requested network slice. Such thresholds may be, for example, 80%, 85%, 90%, 95%, or 99%, among other examples. Further, in some implementations, the slice feasibility application 702 may include, be associated with, or otherwise have access to (such as via a wired or wireless interface) backlog data for calculation and KPI prediction.

Figure 8:
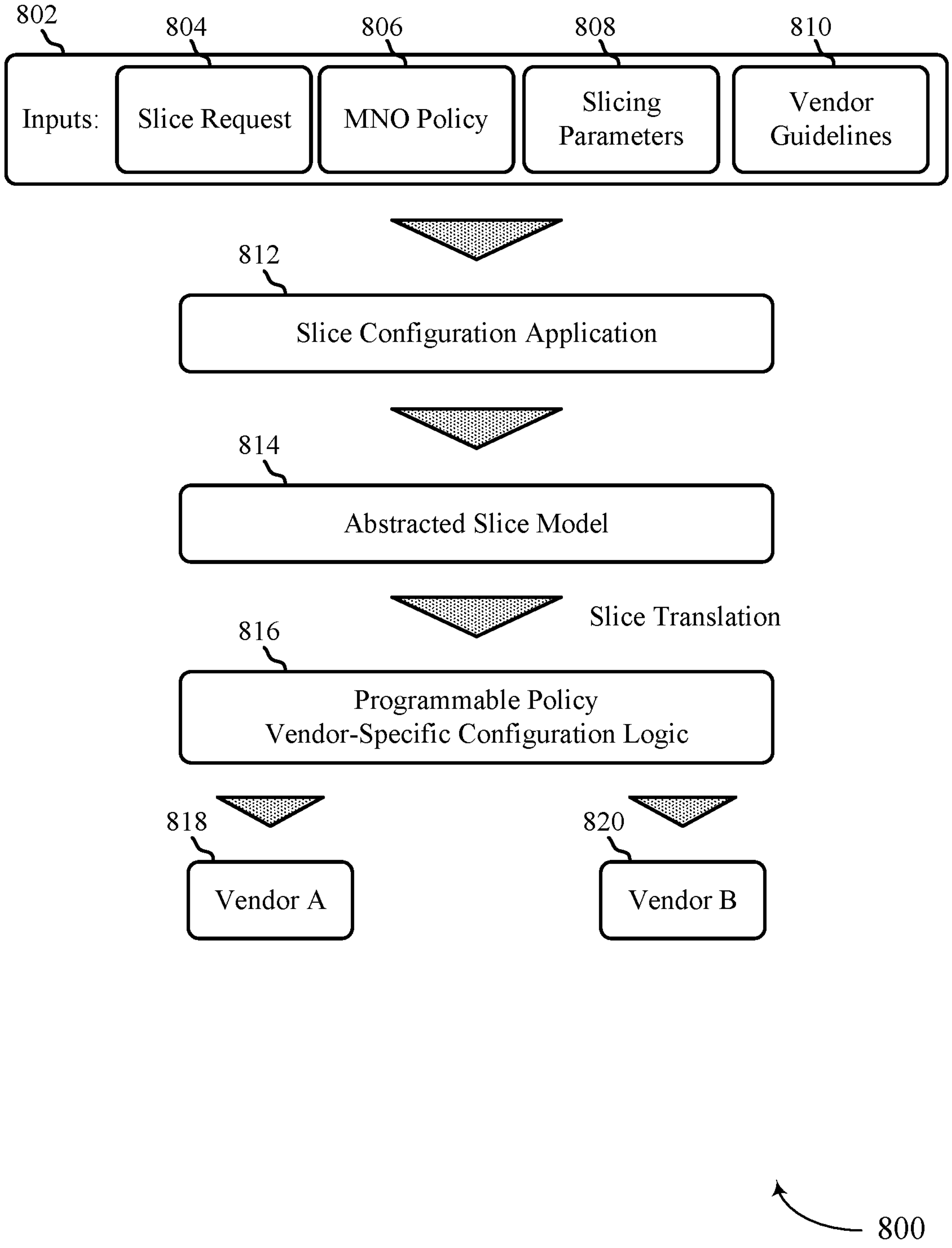
FIG. 8 shows an example slice configuration programmable policy that supports network slice feasibility assessment for slice orchestration in a wireless network.

FIG. 8 shows an example slice configuration programmable policy 800 that supports network slice feasibility assessment for slice orchestration in a wireless network. The slice configuration programmable policy 800 may illustrate how a generic slice request may be transformed to a vendor-specific implementation. For example, a device associated with service management may provide a set of inputs 802, including a slice request 804, an MNO policy 806 (such as an MNO slice admission policy), slicing parameters 808, and vendor guidelines 810, to a slice configuration application 812. In some implementations, the slice configuration application 812 may be an example of a slice configuration application 524 as illustrated by and described with reference to FIG. 5.

The slice request 804 may include information indicative of a slice identity, a coverage area (such as an envisioned slice coverage area), a public land mobile network (PLMN) (such as a PLMN identifier), a slice type, slice performance attributes, or any combination thereof. The MNO policy 806 may include a policy by "slicing strategy," which may include a user setting via a user interface (UI), MNO constraints, parameters design, and rules for mapping a network slice to a frequency band or a specific frequency. The slicing parameters 808 may include resource allocation parameters. The vendor guidelines 810 may include or be associated with one or more managed objects (MOs), one or more parameters aligned with a vendor default parameter set or an MNO recommended parameter list, or any combination thereof. An MO may be an entity usable to build (such as select, provision, or establish) a network configuration. For example, a network structure may be understood or provided as a tree of MOs and under the MOs may be the one or more parameters, which may set the network behavior.

The slice configuration application 812 may take the inputs 802 and may perform one or more operations associated with MNO slicing business logic and network guidelines enforcement rules, which may include auto-classification and ML services, for use cases including a slice configuration request (such as a request for a new slice), a new site, and continuous policy enforcement. For example, the slice configuration application 812 may use, as inputs, categories of data including a first category associated with a generic slice request, a second category associated with an MNO policy, a third category associated with slicing parameters (such as the output of the resource allocation application), and a fourth category associated with vendor guidelines (which may include default or recommended values). The slice configuration application 812 may use auto-classification and ML services (to determine, identify, select, or otherwise ascertain a cell type having the selection of parameters mainly of the fourth category) and, in addition, the slice configuration application 812 may function as a single source of truth (to avoid misalignments that may otherwise occur as a result of multiple sources) for various use cases. Such use cases may include a new slice (such as a request for a new network slice), a new site (which may involve a recognizing of corresponding slices in a new site area, and to trigger new slice(s) configuration in the new site area), and a consistency check. A consistency check may be associated with enforcement of network integrity on, for example, a daily basis (or more frequently). For example, the slice configuration application 812 may perform operations associated with an integrity service as described with reference to FIG. 3. As such, continuous enforcement of parameters may be performed with the same application used to perform an initial slice configuration, supporting the slice configuration application 812 as the single source of truth.

The slice configuration application 812 may output an abstracted slice model 814, which may be associated with a slice identifier, a PLMN, a minimum throughput, a latency target, or a priority level, among other aspects that define or are associated with an abstracted slice model 814. For example, an output of the slice configuration application 812 may be sent for RAN provisioning. The device associated with service management may perform slice translation from the abstracted slice model to a programmable policy and vendor-specific configuration logic 816, which may enable a translation from the abstracted slice model 814 to vendor-specific models. For example, the device may provide a first vendor-specific model to a vendor A 818 and a second vendor-specific model to a vendor B 820.

Figure 9:
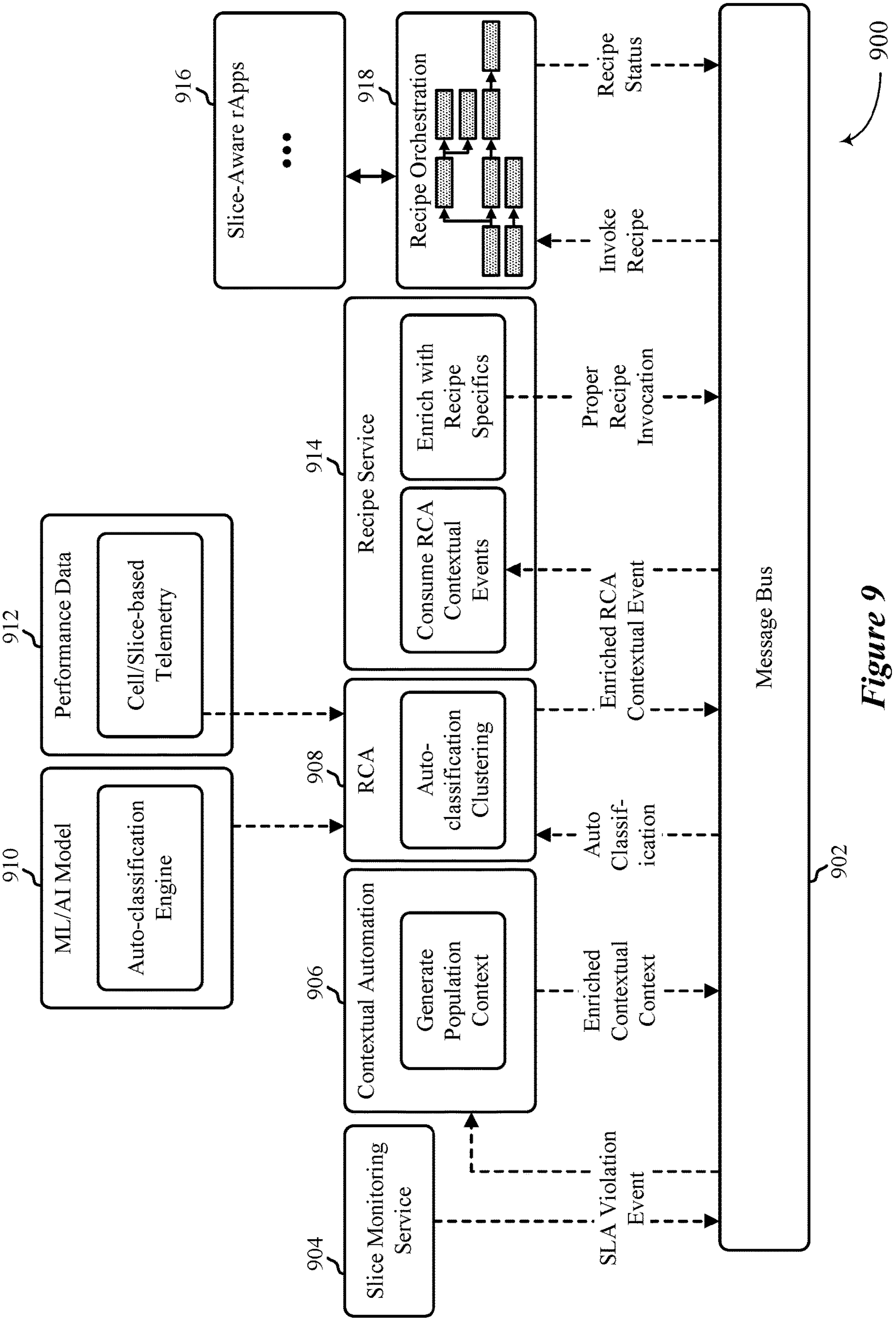
FIG. 9 shows an example slice assurance and management that supports network slice feasibility assessment for slice orchestration in a wireless network.

FIG. 9 shows an example slice assurance and management 900 that supports network slice feasibility assessment for slice orchestration in a wireless network. The slice assurance and management 900 illustrates example signaling between various devices, components, entities, functionalities, or services associated with service management and may be an example of a RAN slicing assurance functional flow associated with automated RAN slice assurance and optimization. The various devices, components, entities, functionalities, or services associated with service management may communicate via a message bus 902.

In some implementations, a slice monitoring service 904 may indicate, to a contextual automation 906 via the message bus 902, an SLA violation event. The contextual automation 906 may generate population context and indicate, to the message bus 902, enriched contextual context associated with the SLA violation event. A root cause analysis (RCA) 908, which may have a role to determine, identify, select, or otherwise ascertain a violation cause and associate a corresponding remedy action through a determined (such as selected) application, may receive auto-classification information from the message bus 902, and such auto-classification information may include information indicative of a coverage issue, an interference issue, a load issue, an exterior interference issue, or no issue. A "no issue" may indicate that a problem is not a RAN problem and is elsewhere in the system. In examples in which a problem does not accrue in the RAN and instead accrues in, for example, the transport (such as the TN), the RCA 908 may avoid triggering any unnecessary RAN domain action. The RCA 908, which may support auto-classification clustering, may receive inputs from an ML/AI model 910 and performance data 912. The ML/AI model 910 may include an auto-classification engine. The performance data 912 may include cell- or slice-based telemetry information.

The RCA 908 may indicate, to a recipe service 914 via the message bus 902, an indication of an enriched RCA contextual event. The recipe service 914 may consume RCA contextual events and enrich with recipe specifics. Accordingly, the recipe service 914 may indicate a proper recipe invocation to the message bus 902. The message bus may invoke the recipe from a recipe orchestration 918, which may interface with one or more rApps 916 (which may be examples of rApps 508 as illustrated by and described with reference to FIG. 5), and the recipe orchestration 918 may indicate a recipe status to the message bus 902. The rApps 916 may include one or more slice-aware applications (such as slice-aware rApps) including a continuous resource optimization application, a massive MIMO application, and a traffic steering application, among other examples. In accordance with the slice assurance and management 900, a device associated with service management may support multiple RANs and multiple vendors, may support RCA, may be programmable and open, and may support orchestration (including multi-slice orchestration).

Figure 10:
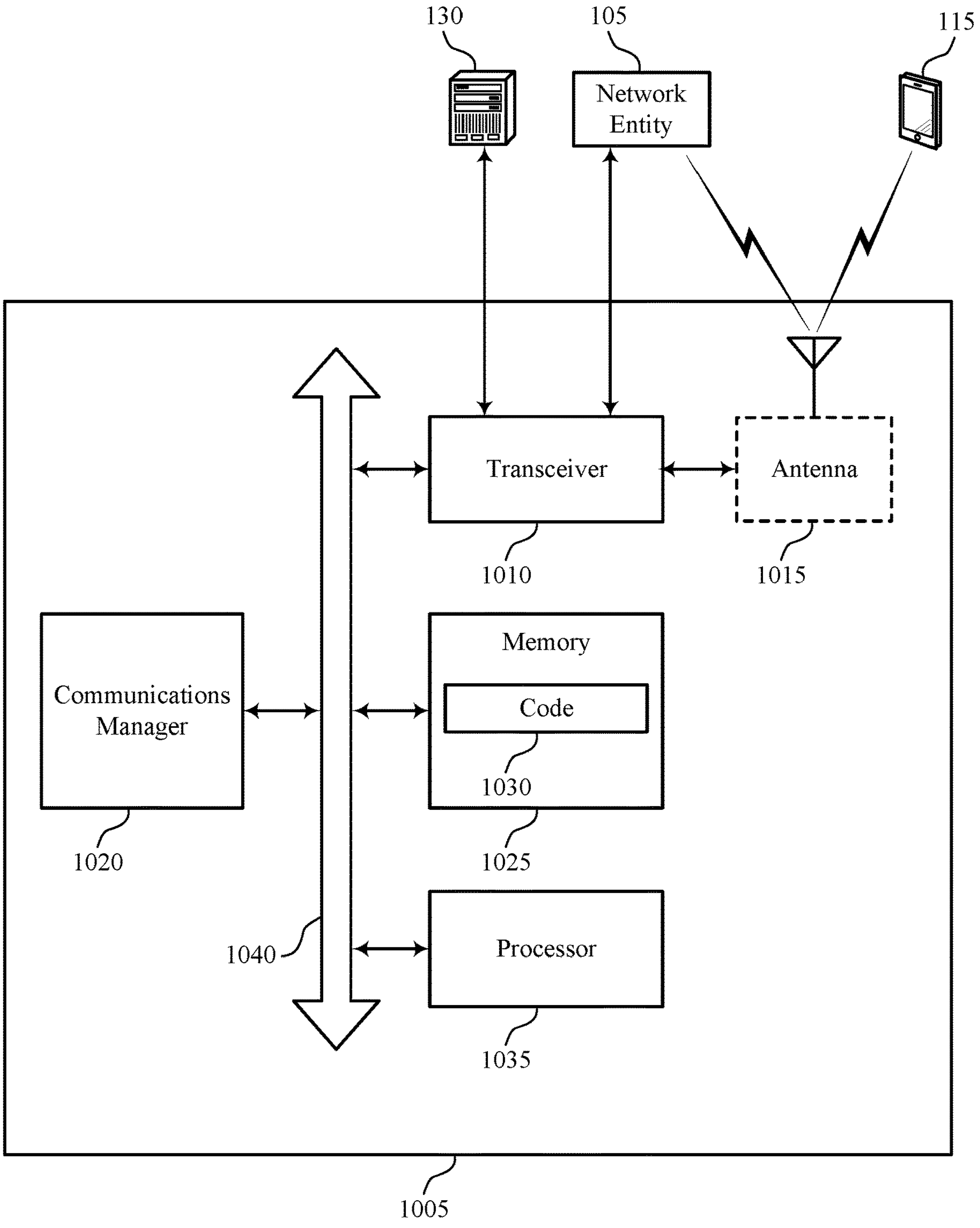
FIG. 10 shows a block diagram of an example device that supports network slice feasibility assessment for slice orchestration in a wireless network.

FIG. 10 shows a block diagram of an example device 1005 that supports network slice feasibility assessment for slice orchestration in a wireless network. The device 1005 may communicate with one or more network entities (such as one or more components of one or more network entities 105), one or more UEs 115, or any combination thereof, which may include communications over one or more wired interfaces, over one or more wireless interfaces, or any combination thereof. The device 1005 may include components that support outputting and obtaining communications, such as a communication manager 1020, a transceiver 1010, an antenna 1015, at least one memory 1025, code 1030, and at least one processor 1035. These components may be in electronic communication or otherwise coupled (such as operatively, communicatively, functionally, electronically, electrically) via one or more buses (such as a bus 1040).

The transceiver 1010 may support bi-directional communications via wired links, wireless links, or both as described herein. In some implementations, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some implementations, the device 1005 may include one or more antennas 1015, which may be capable of transmitting or receiving wireless transmissions (such as concurrently). The transceiver 1010 also may include a modem to modulate signals, to provide the modulated signals for transmission (such as by one or more antennas 1015, by a wired transmitter), to receive modulated signals (such as from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations in accordance with received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (such as the at least one processor 1035, the at least one memory 1025, or both), may be included in a chip or chip assembly that is installed in the device 1005. In some implementations, the transceiver 1010 may be operable to support communications via one or more communications links (such as a communication link 125, a backhaul communication link 120, a midhaul communication link 162, a fronthaul communication link 168).

The at least one memory 1025 may include RAM, ROM, or any combination thereof. The at least one memory 1025 may store computer-readable, computer-executable code 1030 including instructions that, when executed by one or more of the at least one processor 1035, cause the device 1005 to perform various functions described herein. The code 1030 may be stored in a non-transitory computer-readable medium such as system memory or another type of memory. In some implementations, the code 1030 may not be directly executable by a processor of the at least one processor 1035 but may cause a computer (such as when compiled and executed) to perform functions described herein. In some implementations, the at least one memory 1025 may contain, among other things, a BIOS which may control basic hardware or software operation such as the interaction with peripheral components or devices. In some implementations, the at least one processor 1035 may include multiple processors and the at least one memory 1025 may include multiple memories. One or more of the multiple processors may be coupled with one or more of the multiple memories which may, individually or collectively, be configured to perform various functions herein (such as a part of a processing system).

The at least one processor 1035 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the at least one processor 1035 may be configured to operate a memory array using a memory controller. In some other implementations, a memory controller may be integrated into one or more of the at least one processor 1035. The at least one processor 1035 may be configured to execute computer-readable instructions stored in a memory (such as one or more of the at least one memory 1025) to cause the device 1005 to perform various functions (such as functions or tasks supporting network slice feasibility assessment for slice orchestration in a wireless network). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (such as one or more physical nodes and supporting software such as operating systems, virtual machines, or container instances) that may host the functions (such as by executing code 1030) to perform the functions of the device 1005. The at least one processor 1035 may be any one or more suitable processors capable of executing scripts or instructions of one or more software programs stored in the device 1005 (such as within one or more of the at least one memory 1025). In some implementations, the at least one processor 1035 may include multiple processors, and the at least one memory 1025 may include multiple memories. One or more of the multiple processors may be coupled with one or more of the multiple memories which may, individually or collectively, be configured to perform various functions described herein (as part of a processing system).

For example, in some implementations, the at least one processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the at least one processor 1035, or the transceiver 1010, or the communication manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

The device 1005 may include one or more chips, SoCs, chipsets, packages or devices that individually or collectively constitute or comprise a processing system. The processing system includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, a bus 1040 may support communications of (such as within) a protocol layer of a protocol stack. In some implementations, a bus 1040 may support communications associated with a logical channel of a protocol stack (such as between protocol layers of a protocol stack), which may include communications performed within a component of the device 1005, or between different components of the device 1005 that may be co-located or located in different locations (such as where the device 1005 may refer to a system in which one or more of the communication manager 1020, the transceiver 1010, the at least one memory 1025, the code 1030, and the at least one processor 1035 may be located in one of the different components or divided between different components).

In some implementations, the communication manager 1020 may manage aspects of communications with a core network 130 (such as via one or more wired or wireless backhaul links). For example, the communication manager 1020 may manage the transfer of data communications for client devices, such as one or more UEs 115. In some implementations, the communication manager 1020 may manage communications with other network entities 105, and may include a controller or scheduler for controlling communications with UEs 115 in cooperation with other network entities 105. In some implementations, the communication manager 1020 may support an X2 interface within an LTE/LTE-A wireless communications network technology to provide communication between network entities 105.

The device 1005 may support network slice management in a wireless network in accordance with examples as disclosed herein. The communication manager 1020 is capable of, configured to, or operable to support a means for receiving, at a device associated with service management of the wireless network, a request associated with a network slice in the wireless network, the request indicating one or more parameters associated with a service level agreement of the network slice. In some implementations, the communication manager 1020 is capable of, configured to, or operable to support a means for selecting, in accordance with the one or more parameters associated with the service level agreement, a respective physical resource block (PRB) allocation of the network slice for each cell of a set of cells of the wireless network. In some implementations, the communication manager 1020 is capable of, configured to, or operable to support a means for outputting, to a network slice management function and in accordance with a respective PRB utilization at each cell of the set of cells and the respective PRB allocation of the network slice for each cell of the set of cells, a recommendation associated with the network slice.

In some implementations, to support selecting the respective PRB allocation of the network slice for each cell of the set of cells, the communication manager 1020 is capable of, configured to, or operable to support a means for predicting the respective PRB allocation of the network slice for each cell of the set of cells in accordance with the one or more parameters associated with the service level agreement.

In some implementations, to support predicting the respective PRB allocation of the network slice for each cell of the set of cells, the communication manager 1020 is capable of, configured to, or operable to support a means for predicting the respective PRB allocation of the network slice for each cell of the set of cells in accordance with both the one or more parameters associated with the service level agreement and observed network conditions at the set of cells.

In some implementations, the communication manager 1020 is capable of, configured to, or operable to support a means for scanning the set of cells of the wireless network in accordance with respective summations of respective PRB utilizations at the set of cells and respective PRB allocations of the network slice for the set of cells, where outputting the recommendation associated with the network slice is in accordance with scanning the set of cells.

In some implementations, to support outputting the recommendation associated with the network slice, the communication manager 1020 is capable of, configured to, or operable to support a means for outputting, in accordance with greater than or equal to a threshold quantity of cells of the set of cells being able to accommodate the respective summations, an approval of the network slice. In some implementations, to support outputting the recommendation associated with the network slice, the communication manager 1020 is capable of, configured to, or operable to support a means for outputting, in accordance with fewer than the threshold quantity of cells of the set of cells being able to accommodate the respective summations, a rejection of the network slice.

In some implementations, to support outputting the recommendation associated with the network slice, the communication manager 1020 is capable of, configured to, or operable to support a means for outputting, in accordance with cells of the set of cells that are able to accommodate the respective summations serving greater than or equal to a threshold quantity of intended users, an approval of the network slice. In some implementations, to support outputting the recommendation associated with the network slice, the communication manager 1020 is capable of, configured to, or operable to support a means for outputting, in accordance with the cells of the set of cells that are able to accommodate the respective summations serving fewer than the threshold quantity of intended users, a rejection of the network slice.

In some implementations, to support predicting the respective PRB allocation of the network slice for each cell of the set of cells, the communication manager 1020 is capable of, configured to, or operable to support a means for predicting a first PRB allocation of the network slice for a first cell of the set of cells in accordance with the one or more parameters associated with the service level agreement and first observed network conditions at the first cell. In some implementations, to support predicting the respective PRB allocation of the network slice for each cell of the set of cells, the communication manager 1020 is capable of, configured to, or operable to support a means for predicting a second PRB allocation of the network slice for a second cell of the set of cells in accordance with the one or more parameters associated with the service level agreement and second observed network conditions at the second cell.

In some implementations, the communication manager 1020 is capable of, configured to, or operable to support a means for training a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, where the prediction is associated with observed network conditions at the set of cells of the wireless network.

In some implementations, to support training the machine learning model, the communication manager 1020 is capable of, configured to, or operable to support a means for providing, as a training set associated with the machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or any combination thereof.

In some implementations, to support training the machine learning model, the communication manager 1020 is capable of, configured to, or operable to support a means for receiving, at the device associated with the service management of the wireless network and in accordance with deployment of the network slice in the wireless network, information indicative of one or more performance indicators associated with the network slice. In some implementations, to support training the machine learning model, the communication manager 1020 is capable of, configured to, or operable to support a means for updating the machine learning model in accordance with the one or more performance indicators.

In some implementations, to support updating the machine learning model, the communication manager 1020 is capable of, configured to, or operable to support a means for updating the machine learning model in accordance with a delta between the respective PRB allocation of the network slice for each cell of the set of cells and the actual PRB usage by the network slice for each cell of the set of cells.

In some implementations, the observed network conditions at the set of cells include one or more of a channel quality distribution for each cell of the set of cells, a morphology associated with the set of cells, a traffic behavior at each cell of the set of cells, or a frequency band associated with the set of cells.

In some implementations, the communication manager 1020 is capable of, configured to, or operable to support a means for triggering a resource estimation application of the device in accordance with receiving the request, the resource estimation application configured to output the respective PRB allocation of the network slice for each cell of the set of cells. In some implementations, the communication manager 1020 is capable of, configured to, or operable to support a means for storing information indicative of the respective PRB allocation of the network slice for each cell of the set of cells at the device. In some implementations, the communication manager 1020 is capable of, configured to, or operable to support a means for triggering a feasibility application of the device in accordance with storing the information indicative of the respective PRB allocation of the network slice for each cell of the set of cells, the feasibility application configured to output the recommendation associated with the network slice.

In some implementations, a set of inputs to the feasibility application include one or more of a set of radio frequency performance metrics, a capacity assessment associated with the set of cells, the respective PRB allocation of the network slice for each cell of the set of cells, an output of a machine learning model trained to assist in a determination of the recommendation, a traffic forecast associated with the set of cells, a coverage evaluation associated with the set of cells, or a slice admission policy.

In some implementations, the communication manager 1020 is capable of, configured to, or operable to support a means for predicting a future respective PRB utilization at each cell of the set of cells in accordance with a traffic forecast, where the recommendation associated with the network slice is in accordance with the respective PRB utilization at each cell of the set of cells, a prediction of the future respective PRB utilization at each cell of the set of cells, and a prediction of the respective PRB allocation of the network slice for each cell of the set of cells.

In some implementations, the one or more parameters associated with the service level agreement are indicative of one or more of a throughput expectation, a latency constraint, a bit error rate, or a quantity of intended users at each cell of the set of cells.

In some implementations, the one or more parameters associated with the service level agreement are indicative of a slice admission policy associated with the network slice. In some implementations, the recommendation is in accordance with the slice admission policy.

In some implementations, the set of cells are located within a geographic coverage area associated with the network slice.

In some implementations, the set of cells, in accordance with which the recommendation associated with the network slice is output, includes one or more cells of a larger set of cells.

In some implementations, the communication manager 1020 is capable of, configured to, or operable to support a means for training a machine learning model to output the recommendation associated with the network slice in accordance with the larger set of cells, where outputting the recommendation associated with the network slice is in accordance with training the machine learning model.

In some implementations, the communication manager 1020 may be configured to perform various operations (such as receiving, obtaining, monitoring, outputting, transmitting) using or otherwise in cooperation with the transceiver 1010, the one or more antennas 1015 (such as where applicable), or any combination thereof. Although the communication manager 1020 is illustrated as a separate component, in some examples, one or more functions described with reference to the communication manager 1020 may be supported by or performed by the transceiver 1010, one or more of the at least one processor 1035, one or more of the at least one memory 1025, the code 1030, or any combination thereof (such as by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of network slice feasibility assessment for slice orchestration in a wireless network as described herein, or the at least one processor 1035 and the at least one memory 1025 may be otherwise configured to, individually or collectively, perform or support such operations.

Figure 11:
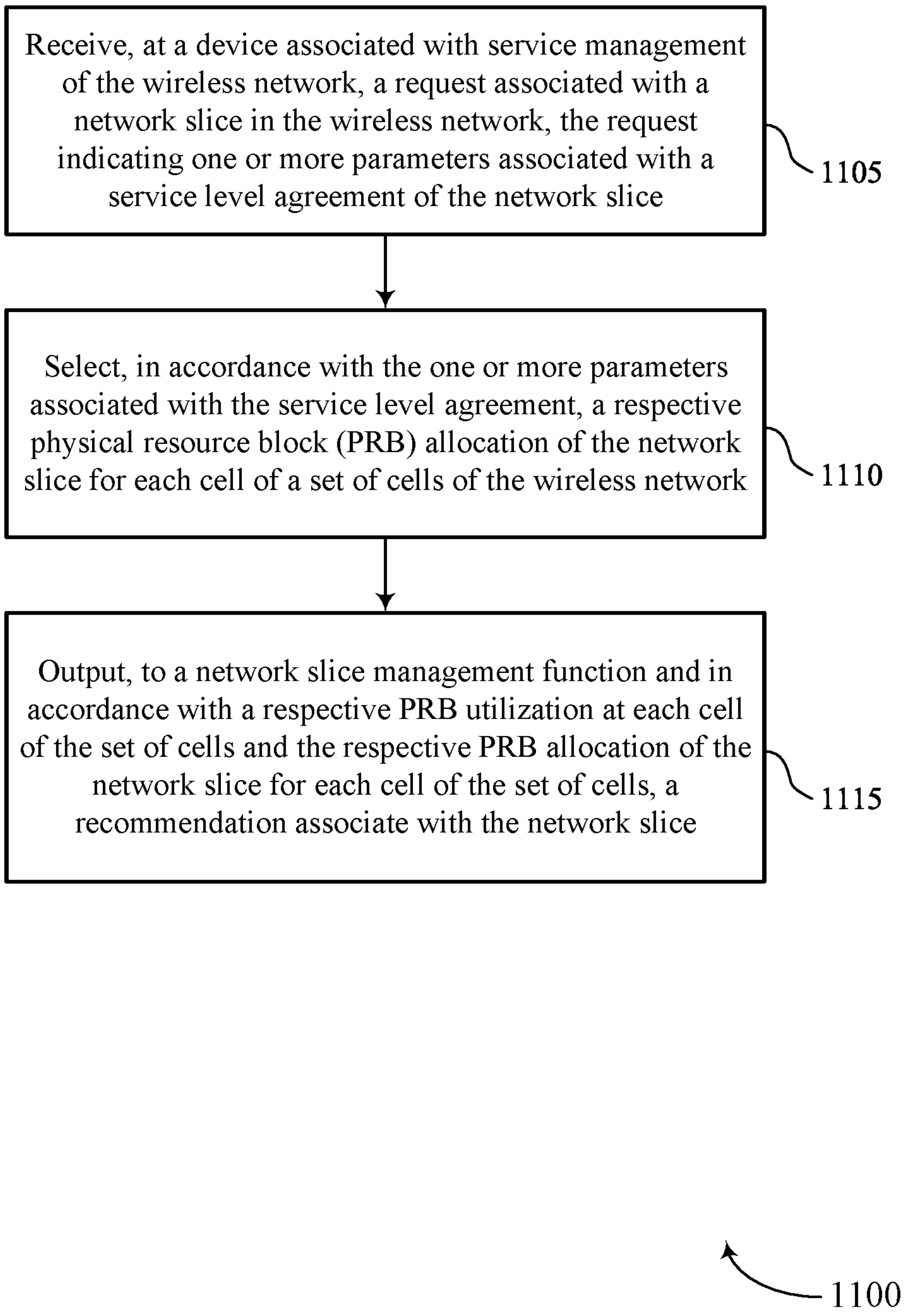
FIG. 11 shows a flowchart illustrating a method that supports network slice feasibility assessment for slice orchestration in a wireless network.

FIG. 11 shows a flowchart illustrating a method 1100 that supports network slice feasibility assessment for slice orchestration in a wireless network in accordance with aspects of the present disclosure. The operations of the method 1100 may be implemented by a network entity or its components as described herein. For example, the operations of the method 1100 may be performed by a network entity as described with reference to FIGS. 1 through 10. In some implementations, a network entity may execute a set of instructions to control the functional elements of the network entity to perform the described functions. Additionally, or alternatively, the network entity may perform aspects of the described functions using special-purpose hardware.

At 1105, the method may include receiving, at a device associated with service management of the wireless network, a request associated with a network slice in the wireless network, the request indicating one or more parameters associated with a service level agreement of the network slice. The operations of block 1105 may be performed in accordance with examples as disclosed herein.

At 1110, the method may include selecting, in accordance with the one or more parameters associated with the service level agreement, a respective physical resource block (PRB) allocation of the network slice for each cell of a set of cells of the wireless network. The operations of block 1110 may be performed in accordance with examples as disclosed herein.

At 1115, the method may include outputting, to a network slice management function and in accordance with a respective PRB utilization at each cell of the set of cells and the respective PRB allocation of the network slice for each cell of the set of cells, a recommendation associated with the network slice. The operations of block 1115 may be performed in accordance with examples as disclosed herein.

Implementation examples are described in the following numbered clauses:

Clause 1: A device associated with service management of a wireless network, including: a processing system that includes processor circuitry and memory circuitry that stores code, the processing system configured to cause the device to: receive a request associated with a network slice in the wireless network, the request indicating one or more parameters associated with an SLA of the network slice; select, in accordance with the one or more parameters associated with the SLA, a respective PRB allocation of the network slice for each cell of a set of cells of the wireless network; and output, to a network slice management function and in accordance with a respective PRB utilization at each cell of the set of cells and the respective PRB allocation of the network slice for each cell of the set of cells, a recommendation associated with the network slice.

Clause 2: The device of clause 1, where, to select the respective PRB allocation of the network slice for each cell of the set of cells, the processing system is further configured to cause the device to predict the respective PRB allocation of the network slice for each cell of the set of cells in accordance with the one or more parameters associated with the SLA.

Clause 3: The device of clause 2, where, to predict the respective PRB allocation of the network slice for each cell of the set of cells, the processing system is further configured to cause the device to predict the respective PRB allocation of the network slice for each cell of the set of cells in accordance with both the one or more parameters associated with the SLA and observed network conditions at the set of cells.

Clause 4: The device of any of clauses 2-3, where the processing system is further configured to cause the device to: scan the set of cells of the wireless network in accordance with respective summations of respective PRB utilizations at the set of cells and respective PRB allocations of the network slice for the set of cells, where outputting the recommendation associated with the network slice is in accordance with scanning the set of cells.

Clause 5: The device of clause 4, where, to output the recommendation associated with the network slice, the processing system is further configured to cause the device to output, in accordance with greater than or equal to a threshold quantity of cells of the set of cells be able to accommodate the respective summations, an approval of the network slice; or output, in accordance with fewer than the threshold quantity of cells of the set of cells be able to accommodate the respective summations, a rejection of the network slice.

Clause 6: The device of any of clauses 4-5, where, to output the recommendation associated with the network slice, the processing system is further configured to cause the device to output, in accordance with cells of the set of cells that be able to accommodate the respective summations serving greater than or equal to a threshold quantity of intended users, an approval of the network slice; or output, in accordance with the cells of the set of cells that be able to accommodate the respective summations serving fewer than the threshold quantity of intended users, a rejection of the network slice.

Clause 7: The device of any of clauses 2-6, where, to predict the respective PRB allocation of the network slice for each cell of the set of cells, the processing system is further configured to cause the device to predict a first PRB allocation of the network slice for a first cell of the set of cells in accordance with the one or more parameters associated with the SLA and first observed network conditions at the first cell; and predict a second PRB allocation of the network slice for a second cell of the set of cells in accordance with the one or more parameters associated with the SLA and second observed network conditions at the second cell.

Clause 8: The device of any of clauses 1-7, where the processing system is further configured to cause the device to: train a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, where the prediction is associated with observed network conditions at the set of cells of the wireless network.

Clause 9: The device of clause 8, where, to train the machine learning model, the processing system is further configured to cause the device to provide, as a training set associated with the machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or any combination thereof.

Clause 10: The device of any of clauses 8-9, where, to train the machine learning model, the processing system is further configured to cause the device to receive, at the device associated with the service management of the wireless network and in accordance with deployment of the network slice in the wireless network, information indicative of one or more performance indicators associated with the network slice; and update the machine learning model in accordance with the one or more performance indicators.

Clause 11: The device of clause 10, where the one or more performance indicators include an actual PRB usage by the network slice at each of the set of cells, and where, to update the machine learning model, the processing system is further configured to cause the device to update the machine learning model in accordance with a delta between the respective PRB allocation of the network slice for each cell of the set of cells and the actual PRB usage by the network slice for each cell of the set of cells.

Clause 12: The device of any of clauses 8-11, where the observed network conditions at the set of cells include one or more of a channel quality distribution for each cell of the set of cells, a morphology associated with the set of cells, a traffic behavior at each cell of the set of cells, or a frequency band associated with the set of cells.

Clause 13: The device of any of clauses 1-12, where the processing system is further configured to cause the device to: trigger a resource estimation application of the device in accordance with receiving the request, the resource estimation application configured to output the respective PRB allocation of the network slice for each cell of the set of cells; store information indicative of the respective PRB allocation of the network slice for each cell of the set of cells at the device; and trigger a feasibility application of the device in accordance with storing the information indicative of the respective PRB allocation of the network slice for each cell of the set of cells, the feasibility application configured to output the recommendation associated with the network slice.

Clause 14: The device of clause 13, where a set of inputs to the feasibility application include one or more of a set of radio frequency performance metrics, a capacity assessment associated with the set of cells, the respective PRB allocation of the network slice for each cell of the set of cells, an output of a machine learning model trained to assist in a determination of the recommendation, a traffic forecast associated with the set of cells, a coverage evaluation associated with the set of cells, or a slice admission policy.

Clause 15: The device of any of clauses 1-14, where the processing system is further configured to cause the device to: predict a future respective PRB utilization at each cell of the set of cells in accordance with a traffic forecast, where the recommendation associated with the network slice is in accordance with the respective PRB utilization at each cell of the set of cells, a prediction of the future respective PRB utilization at each cell of the set of cells, and a prediction of the respective PRB allocation of the network slice for each cell of the set of cells.

Clause 16: The device of any of clauses 1-15, where the one or more parameters associated with the SLA are indicative of one or more of a throughput expectation, a latency constraint, a bit error rate, or a quantity of intended users at each cell of the set of cells.

Clause 17: The device of any of clauses 1-16, where the one or more parameters associated with the SLA are indicative of a slice admission policy associated with the network slice, and the recommendation is in accordance with the slice admission policy.

Clause 18: The device of any of clauses 1-17, where the set of cells are located within a geographic coverage area associated with the network slice.

Clause 19: The device of any of clauses 1-18, where the set of cells, in accordance with which the recommendation associated with the network slice is output, includes one or more cells of a larger set of cells.

Clause 20: The device of clause 19, where the processing system is further configured to cause the device to: train a machine learning model to output the recommendation associated with the network slice in accordance with the larger set of cells, where outputting the recommendation associated with the network slice is in accordance with training the machine learning model.

Clause 21: A method for network slice management in a wireless network, including: receiving, at a device associated with service management of the wireless network, a request associated with a network slice in the wireless network, the request indicating one or more parameters associated with an SLA of the network slice; selecting, in accordance with the one or more parameters associated with the SLA, a respective PRB allocation of the network slice for each cell of a set of cells of the wireless network; and outputting, to a network slice management function and in accordance with a respective PRB utilization at each cell of the set of cells and the respective PRB allocation of the network slice for each cell of the set of cells, a recommendation associated with the network slice.

Clause 22: The method of clause 21, where selecting the respective PRB allocation of the network slice for each cell of the set of cells further includes: predicting the respective PRB allocation of the network slice for each cell of the set of cells in accordance with the one or more parameters associated with the SLA.

Clause 23: The method of clause 22, where predicting the respective PRB allocation of the network slice for each cell of the set of cells further includes: predicting the respective PRB allocation of the network slice for each cell of the set of cells in accordance with both the one or more parameters associated with the SLA and observed network conditions at the set of cells.

Clause 24: The method of any of clauses 22-23, further including: scanning the set of cells of the wireless network in accordance with respective summations of respective PRB utilizations at the set of cells and respective PRB allocations of the network slice for the set of cells, where outputting the recommendation associated with the network slice is in accordance with scanning the set of cells.

Clause 25: The method of clause 24, where outputting the recommendation associated with the network slice includes: outputting, in accordance with greater than or equal to a threshold quantity of cells of the set of cells being able to accommodate the respective summations, an approval of the network slice; or outputting, in accordance with fewer than the threshold quantity of cells of the set of cells being able to accommodate the respective summations, a rejection of the network slice.

Clause 26: The method of any of clauses 24-25, where outputting the recommendation associated with the network slice includes: outputting, in accordance with cells of the set of cells that are able to accommodate the respective summations serving greater than or equal to a threshold quantity of intended users, an approval of the network slice; or outputting, in accordance with the cells of the set of cells that are able to accommodate the respective summations serving fewer than the threshold quantity of intended users, a rejection of the network slice.

Clause 27: The method of any of clauses 22-26, where predicting the respective PRB allocation of the network slice for each cell of the set of cells further includes: predicting a first PRB allocation of the network slice for a first cell of the set of cells in accordance with the one or more parameters associated with the SLA and first observed network conditions at the first cell; and predicting a second PRB allocation of the network slice for a second cell of the set of cells in accordance with the one or more parameters associated with the SLA and second observed network conditions at the second cell.

Clause 28: The method of any of clauses 21-27, further including: training a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, where the prediction is associated with observed network conditions at the set of cells of the wireless network.

Clause 29: The method of clause 28, where training the machine learning model includes: providing, as a training set associated with the machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or any combination thereof.

Clause 30: The method of any of clauses 28-29, where training the machine learning model includes: receiving, at the device associated with the service management of the wireless network and in accordance with deployment of the network slice in the wireless network, information indicative of one or more performance indicators associated with the network slice; and updating the machine learning model in accordance with the one or more performance indicators.

Clause 31: The method of clause 30, where the one or more performance indicators include an actual PRB usage by the network slice at each of the set of cells, and where updating the machine learning model further includes: updating the machine learning model in accordance with a delta between the respective PRB allocation of the network slice for each cell of the set of cells and the actual PRB usage by the network slice for each cell of the set of cells.

Clause 32: The method of any of clauses 28-31, where the observed network conditions at the set of cells include one or more of a channel quality distribution for each cell of the set of cells, a morphology associated with the set of cells, a traffic behavior at each cell of the set of cells, or a frequency band associated with the set of cells.

Clause 33: The method of any of clauses 21-32, further including: triggering a resource estimation application of the device in accordance with receiving the request, the resource estimation application configured to output the respective PRB allocation of the network slice for each cell of the set of cells; storing information indicative of the respective PRB allocation of the network slice for each cell of the set of cells at the device; and triggering a feasibility application of the device in accordance with storing the information indicative of the respective PRB allocation of the network slice for each cell of the set of cells, the feasibility application configured to output the recommendation associated with the network slice.

Clause 34: The method of clause 33, where a set of inputs to the feasibility application include one or more of a set of radio frequency performance metrics, a capacity assessment associated with the set of cells, the respective PRB allocation of the network slice for each cell of the set of cells, an output of a machine learning model trained to assist in a determination of the recommendation, a traffic forecast associated with the set of cells, a coverage evaluation associated with the set of cells, or a slice admission policy.

Clause 35: The method of any of clauses 21-34, further including: predicting a future respective PRB utilization at each cell of the set of cells in accordance with a traffic forecast, where the recommendation associated with the network slice is in accordance with the respective PRB utilization at each cell of the set of cells, a prediction of the future respective PRB utilization at each cell of the set of cells, and a prediction of the respective PRB allocation of the network slice for each cell of the set of cells.

Clause 36: The method of any of clauses 21-35, where the one or more parameters associated with the SLA are indicative of one or more of a throughput expectation, a latency constraint, a bit error rate, or a quantity of intended users at each cell of the set of cells.

Clause 37: The method of any of clauses 21-36, where the one or more parameters associated with the SLA are indicative of a slice admission policy associated with the network slice, and the recommendation is in accordance with the slice admission policy.

Clause 36: The method of any of clauses 21-37, where the set of cells are located within a geographic coverage area associated with the network slice.

Clause 39: The method of any of clauses 21-38, where the set of cells, in accordance with which the recommendation associated with the network slice is output, includes one or more cells of a larger set of cells.

Clause 40: The method of clause 39, further including: training a machine learning model to output the recommendation associated with the network slice in accordance with the larger set of cells, where outputting the recommendation associated with the network slice is in accordance with training the machine learning model.

Clause 41: A device associated with service management of a wireless network, including: means for receiving a request associated with a network slice in the wireless network, the request indicating one or more parameters associated with an SLA of the network slice; means for selecting, in accordance with the one or more parameters associated with the SLA, a respective PRB allocation of the network slice for each cell of a set of cells of the wireless network; and means for outputting, to a network slice management function and in accordance with a respective PRB utilization at each cell of the set of cells and the respective PRB allocation of the network slice for each cell of the set of cells, a recommendation associated with the network slice.

Clause 42: The device of clause 41, where the means for selecting the respective PRB allocation of the network slice for each cell of the set of cells further include: means for predicting the respective PRB allocation of the network slice for each cell of the set of cells in accordance with the one or more parameters associated with the SLA.

Clause 43: The device of clause 42, where the means for predicting the respective PRB allocation of the network slice for each cell of the set of cells further include: means for predicting the respective PRB allocation of the network slice for each cell of the set of cells in accordance with both the one or more parameters associated with the SLA and observed network conditions at the set of cells.

Clause 44: The device of any of clauses 42-43, further including: means for scanning the set of cells of the wireless network in accordance with respective summations of respective PRB utilizations at the set of cells and respective PRB allocations of the network slice for the set of cells, where outputting the recommendation associated with the network slice is in accordance with scanning the set of cells.

Clause 45: The device of clause 44, where the means for outputting the recommendation associated with the network slice include: means for outputting, in accordance with greater than or equal to a threshold quantity of cells of the set of cells being able to accommodate the respective summations, an approval of the network slice; or means for outputting, in accordance with fewer than the threshold quantity of cells of the set of cells being able to accommodate the respective summations, a rejection of the network slice.

Clause 46: The device of any of clauses 44-45, where the means for outputting the recommendation associated with the network slice include: means for outputting, in accordance with cells of the set of cells that are able to accommodate the respective summations serving greater than or equal to a threshold quantity of intended users, an approval of the network slice; or means for outputting, in accordance with the cells of the set of cells that are able to accommodate the respective summations serving fewer than the threshold quantity of intended users, a rejection of the network slice.

Clause 47: The device of any of clauses 42-46, where the means for predicting the respective PRB allocation of the network slice for each cell of the set of cells further include:

means for predicting a first PRB allocation of the network slice for a first cell of the set of cells in accordance with the one or more parameters associated with the SLA and first observed network conditions at the first cell; and means for predicting a second PRB allocation of the network slice for a second cell of the set of cells in accordance with the one or more parameters associated with the SLA and second observed network conditions at the second cell.

Clause 48: The device of any of clauses 41-47, further including: means for training a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, where the prediction is associated with observed network conditions at the set of cells of the wireless network.

Clause 49: The device of clause 48, where the means for training the machine learning model include: means for providing, as a training set associated with the machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or any combination thereof.

Clause 50: The device of any of clauses 48-49, where the means for training the machine learning model include: means for receiving, at the device associated with the service management of the wireless network and in accordance with deployment of the network slice in the wireless network, information indicative of one or more performance indicators associated with the network slice; and means for updating the machine learning model in accordance with the one or more performance indicators.

Clause 51: The device of clause 50, where the one or more performance indicators include an actual PRB usage by the network slice at each of the set of cells, and where the means for updating the machine learning model further include: means for updating the machine learning model in accordance with a delta between the respective PRB allocation of the network slice for each cell of the set of cells and the actual PRB usage by the network slice for each cell of the set of cells.

Clause 52: The device of any of clauses 48-51, where the observed network conditions at the set of cells include one or more of a channel quality distribution for each cell of the set of cells, a morphology associated with the set of cells, a traffic behavior at each cell of the set of cells, or a frequency band associated with the set of cells.

Clause 53: The device of any of clauses 41-52, further including: means for triggering a resource estimation application of the device in accordance with receiving the request, the resource estimation application configured to output the respective PRB allocation of the network slice for each cell of the set of cells; means for storing information indicative of the respective PRB allocation of the network slice for each cell of the set of cells at the device; and means for triggering a feasibility application of the device in accordance with storing the information indicative of the respective PRB allocation of the network slice for each cell of the set of cells, the feasibility application configured to output the recommendation associated with the network slice.

Clause 54: The device of clause 53, where a set of inputs to the feasibility application include one or more of a set of radio frequency performance metrics, a capacity assessment associated with the set of cells, the respective PRB allocation of the network slice for each cell of the set of cells, an output of a machine learning model trained to assist in a determination of the recommendation, a traffic forecast associated with the set of cells, a coverage evaluation associated with the set of cells, or a slice admission policy.

Clause 55: The device of any of clauses 41-54, further including: means for predicting a future respective PRB utilization at each cell of the set of cells in accordance with a traffic forecast, where the recommendation associated with the network slice is in accordance with the respective PRB utilization at each cell of the set of cells, a prediction of the future respective PRB utilization at each cell of the set of cells, and a prediction of the respective PRB allocation of the network slice for each cell of the set of cells.

Clause 56: The device of any of clauses 41-55, where the one or more parameters associated with the SLA are indicative of one or more of a throughput expectation, a latency constraint, a bit error rate, or a quantity of intended users at each cell of the set of cells.

Clause 57: The device of any of clauses 41-56, where the one or more parameters associated with the SLA are indicative of a slice admission policy associated with the network slice, and the recommendation is in accordance with the slice admission policy.

Clause 58: The device of any of clauses 41-57, where the set of cells are located within a geographic coverage area associated with the network slice.

Clause 59: The device of any of clauses 41-58, where the set of cells, in accordance with which the recommendation associated with the network slice is output, includes one or more cells of a larger set of cells.

Clause 60: The device of clause 59, further including: means for training a machine learning model to output the recommendation associated with the network slice in accordance with the larger set of cells, where outputting the recommendation associated with the network slice is in accordance with training the machine learning model.

Clause 61: A non-transitory computer-readable medium storing code for network slice management in a wireless network, the code including instructions executable by a processing system (such as by one or more processors, individually or collectively) to: receive, at a device associated with service management of the wireless network, a request associated with a network slice in the wireless network, the request indicating one or more parameters associated with an SLA of the network slice; select, in accordance with the one or more parameters associated with the SLA, a respective PRB allocation of the network slice for each cell of a set of cells of the wireless network; and outputting, to a network slice management function and in accordance with a respective PRB utilization at each cell of the set of cells and the respective PRB allocation of the network slice for each cell of the set of cells, a recommendation associated with the network slice.

Clause 62: The non-transitory computer-readable medium of clause 55, where the code to select the respective PRB allocation of the network slice for each cell of the set of cells are further executable by the processing system to: predict the respective PRB allocation of the network slice for each cell of the set of cells in accordance with the one or more parameters associated with the SLA.

Clause 63: The non-transitory computer-readable medium of clause 62, where the code to predict the respective PRB allocation of the network slice for each cell of the set of cells are further executable by the processing system to: predict the respective PRB allocation of the network slice for each cell of the set of cells in accordance with both the one or more parameters associated with the SLA and observed network conditions at the set of cells.

Clause 64: The non-transitory computer-readable medium of any of clauses 62-63, where the instructions are further executable by the processing system to: scan the set of cells of the wireless network in accordance with respective summations of respective PRB utilizations at the set of cells and respective PRB allocations of the network slice for the set of cells, where outputting the recommendation associated with the network slice is in accordance with scanning the set of cells.

Clause 65: The non-transitory computer-readable medium of clause 64, where the code to output the recommendation associated with the network slice are executable by the processing system to: outputting, in accordance with greater than or equal to a threshold quantity of cells of the set of cells be able to accommodate the respective summations, an approval of the network slice; or outputting, in accordance with fewer than the threshold quantity of cells of the set of cells be able to accommodate the respective summations, a rejection of the network slice.

Clause 66: The non-transitory computer-readable medium of any of clauses 64-65, where the code to output the recommendation associated with the network slice are executable by the processing system to: outputting, in accordance with cells of the set of cells that be able to accommodate the respective summations serving greater than or equal to a threshold quantity of intended users, an approval of the network slice; or outputting, in accordance with the cells of the set of cells that be able to accommodate the respective summations serving fewer than the threshold quantity of intended users, a rejection of the network slice.

Clause 67: The non-transitory computer-readable medium of any of clauses 62-66, where the code to predict the respective PRB allocation of the network slice for each cell of the set of cells are further executable by the processing system to: predict a first PRB allocation of the network slice for a first cell of the set of cells in accordance with the one or more parameters associated with the SLA and first observed network conditions at the first cell; and predict a second PRB allocation of the network slice for a second cell of the set of cells in accordance with the one or more parameters associated with the SLA and second observed network conditions at the second cell.

Clause 68: The non-transitory computer-readable medium of any of clauses 61-67, where the instructions are further executable by the processing system to: train a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, where the prediction is associated with observed network conditions at the set of cells of the wireless network.

Clause 69: The non-transitory computer-readable medium of clause 68, where the code to train the machine learning model are executable by the processing system to: provide, as a training set associated with the machine learning model, a set of multiple network snapshots, where each network snapshot of the set of multiple network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or any combination thereof.

Clause 70: The non-transitory computer-readable medium of any of clauses 68-69, where the code to train the machine learning model are executable by the processing system to: receive, at the device associated with the service management of the wireless network and in accordance with deployment of the network slice in the wireless network, information indicative of one or more performance indicators associated with the network slice; and update the machine learning model in accordance with the one or more performance indicators.

Clause 71: The non-transitory computer-readable medium of clause 70, where the one or more performance indicators include an actual PRB usage by the network slice at each of the set of cells, and where the code to update the machine learning model are further executable by the processing system to: update the machine learning model in accordance with a delta between the respective PRB allocation of the network slice for each cell of the set of cells and the actual PRB usage by the network slice for each cell of the set of cells.

Clause 72: The non-transitory computer-readable medium of any of clauses 68-71, where the observed network conditions at the set of cells include one or more of a channel quality distribution for each cell of the set of cells, a morphology associated with the set of cells, a traffic behavior at each cell of the set of cells, or a frequency band associated with the set of cells.

Clause 73: The non-transitory computer-readable medium of any of clauses 61-72, where the instructions are further executable by the processing system to: trigger a resource estimation application of the device in accordance with receiving the request, the resource estimation application configured to output the respective PRB allocation of the network slice for each cell of the set of cells; store information indicative of the respective PRB allocation of the network slice for each cell of the set of cells at the device; and trigger a feasibility application of the device in accordance with storing the information indicative of the respective PRB allocation of the network slice for each cell of the set of cells, the feasibility application configured to output the recommendation associated with the network slice.

Clause 74: The non-transitory computer-readable medium of clause 73, where a set of inputs to the feasibility application include one or more of a set of radio frequency performance metrics, a capacity assessment associated with the set of cells, the respective PRB allocation of the network slice for each cell of the set of cells, an output of a machine learning model trained to assist in a determination of the recommendation, a traffic forecast associated with the set of cells, a coverage evaluation associated with the set of cells, or a slice admission policy.

Clause 75: The non-transitory computer-readable medium of any of clauses 61-74, where the instructions are further executable by the processing system to: predict a future respective PRB utilization at each cell of the set of cells in accordance with a traffic forecast, where the recommendation associated with the network slice is in accordance with the respective PRB utilization at each cell of the set of cells, a prediction of the future respective PRB utilization at each cell of the set of cells, and a prediction of the respective PRB allocation of the network slice for each cell of the set of cells.

Clause 76: The non-transitory computer-readable medium of any of clauses 61-75, where the one or more parameters associated with the SLA are indicative of one or more of a throughput expectation, a latency constraint, a bit error rate, or a quantity of intended users at each cell of the set of cells.

Clause 77: The non-transitory computer-readable medium of any of clauses 61-76, where the one or more parameters associated with the SLA are indicative of a slice admission policy associated with the network slice, and the recommendation is in accordance with the slice admission policy.

Clause 78: The non-transitory computer-readable medium of any of clauses 61-77, where the set of cells are located within a geographic coverage area associated with the network slice.

Clause 79: The non-transitory computer-readable medium of any of clauses 61-78, where the set of cells, in accordance with which the recommendation associated with the network slice is output, includes one or more cells of a larger set of cells.

Clause 80: The non-transitory computer-readable medium of clause 79, where the instructions are further executable by the processing system to: train a machine learning model to output the recommendation associated with the network slice in accordance with the larger set of cells, where outputting the recommendation associated with the network slice is in accordance with training the machine learning model.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Also, as used herein, the phrase "a set" may be understood as including the possibility of a set with one member. That is, the phrase "a set" may be understood in the same manner as "one or more" or "at least one of."

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components." Additionally, a "set" refers to one or more items, and a "subset" refers to less than a whole set, but non-empty.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A device associated with service management of a wireless network, comprising:

a processing system that includes processor circuitry and memory circuitry that stores code, the processing system configured to cause the device to:

receive a request to admit a network slice in the wireless network, the request indicating one or more parameters associated with a service level agreement of the network slice;

select, in accordance with the one or more parameters associated with the service level agreement, a respective physical resource block (PRB) allocation of the network slice for each cell of a set of cells of the wireless network, wherein, to select the respective PRB allocation of the network slice for each cell of the set of cells, the processing system is further configured to cause the device to:

predict a first PRB allocation of the network slice for a first cell of the set of cells in accordance with the one or more parameters associated with the service level agreement and first observed network conditions at the first cell; and predict a second PRB allocation of the network slice for a second cell of the set of cells in accordance with the one or more parameters associated with the service level agreement and second observed network conditions at the second cell; and output, to a network slice management function and in accordance with a respective PRB utilization at each cell of the set of cells and the respective PRB allocation of the network slice for each cell of the set of cells, a recommendation associated with the network slice, the recommendation comprising an approval or a rejection of the network slice to the wireless network.

2. The device of claim 1, wherein, to select the respective PRB allocation of the network slice for each cell of the set of cells, the processing system is further configured to cause the device to:

predict the respective PRB allocation of the network slice for each cell of the set of cells in accordance with the one or more parameters associated with the service level agreement.

3. The device of claim 2, wherein, to predict the respective PRB allocation of the network slice for each cell of the set of cells, the processing system is further configured to cause the device to:

predict the respective PRB allocation of the network slice for each cell of the set of cells in accordance with both the one or more parameters associated with the service level agreement and observed network conditions at the set of cells.

4. The device of claim 2, wherein the processing system is further configured to cause the device to:

scan the set of cells of the wireless network in accordance with respective summations of respective PRB utilizations at the set of cells and respective PRB allocations of the network slice for the set of cells, wherein outputting the recommendation associated with the network slice is in accordance with scanning the set of cells.

5. The device of claim 4, wherein, to output the recommendation associated with the network slice, the processing system is further configured to cause the device to:

output, in accordance with greater than or equal to a threshold quantity of cells of the set of cells be able to accommodate the respective summations, the approval of the network slice; or output, in accordance with fewer than the threshold quantity of cells of the set of cells be able to accommodate the respective summations, the rejection of the network slice.

6. The device of claim 4, wherein, to output the recommendation associated with the network slice, the processing system is further configured to cause the device to:

output, in accordance with cells of the set of cells that be able to accommodate the respective summations serving greater than or equal to a threshold quantity of intended users, the approval of the network slice; or output, in accordance with the cells of the set of cells that be able to accommodate the respective summations serving fewer than the threshold quantity of intended users, the rejection of the network slice.

7. The device of claim 1, wherein the processing system is further configured to cause the device to:

train a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, wherein the prediction is associated with observed network conditions at the set of cells of the wireless network.

8. The device of claim 7, wherein, to train the machine learning model, the processing system is further configured to cause the device to:

provide, as a training set associated with the machine learning model, a plurality of network snapshots, wherein each network snapshot of the plurality of network snapshots corresponds to a suitable PRB allocation to a requested network slice and is associated with a unique permutation of one or more cell types, one or more cluster sizes, one or more cell physical characteristics, one or more cell load conditions, or one or more cell channel quality distributions, one or more interference levels, or any combination thereof.

9. The device of claim 7, wherein, to train the machine learning model, the processing system is further configured to cause the device to:

receive, at the device associated with the service management of the wireless network and in accordance with deployment of the network slice in the wireless network, information indicative of one or more performance indicators associated with the network slice; and update the machine learning model in accordance with the one or more performance indicators.

10. The device of claim 9, wherein the one or more performance indicators include an actual PRB usage by the network slice at each of the set of cells, and wherein, to update the machine learning model, the processing system is further configured to cause the device to:

update the machine learning model in accordance with a delta between the respective PRB allocation of the network slice for each cell of the set of cells and the actual PRB usage by the network slice for each cell of the set of cells.

11. The device of claim 7, wherein the observed network conditions at the set of cells include one or more of a channel quality distribution for each cell of the set of cells, the morphology associated with the set of cells, a traffic behavior at each cell of the set of cells, or a frequency band associated with the set of cells.

12. The device of claim 1, wherein the processing system is further configured to cause the device to:

trigger a resource estimation application of the device in accordance with receiving the request, the resource estimation application configured to output the respective PRB allocation of the network slice for each cell of the set of cells;

store information indicative of the respective PRB allocation of the network slice for each cell of the set of cells at the device; and trigger a feasibility application of the device in accordance with storing the information indicative of the respective PRB allocation of the network slice for each cell of the set of cells, the feasibility application configured to output the recommendation associated with the network slice.

13. The device of claim 12, wherein a set of inputs to the feasibility application include one or more of a set of radio frequency performance metrics, a capacity assessment associated with the set of cells, the respective PRB allocation of the network slice for each cell of the set of cells, an output of a machine learning model trained to assist in a determination of the recommendation, a traffic forecast associated with the set of cells, a coverage evaluation associated with the set of cells, or a slice admission policy.

14. The device of claim 1, wherein the processing system is further configured to cause the device to:

predict a future respective PRB utilization at each cell of the set of cells in accordance with a traffic forecast, wherein the recommendation associated with the network slice is in accordance with the respective PRB utilization at each cell of the set of cells, a prediction of the future respective PRB utilization at each cell of the set of cells, and a prediction of the respective PRB allocation of the network slice for each cell of the set of cells.

15. The device of claim 1, wherein the one or more parameters associated with the service level agreement are indicative of one or more of a throughput expectation, a latency constraint, a bit error rate, or a quantity of intended users at each cell of the set of cells.

16. The device of claim 1, wherein the one or more parameters associated with the service level agreement are indicative of a slice admission policy associated with the network slice, and wherein the recommendation is in accordance with the slice admission policy.

17. The device of claim 1, wherein the set of cells are located within a geographic coverage area associated with the network slice.

18. The device of claim 1, wherein the set of cells, in accordance with which the recommendation associated with the network slice is output, includes one or more cells of a larger set of cells.

19. The device of claim 18, wherein the processing system is further configured to cause the device to:

train a machine learning model to output the recommendation associated with the network slice in accordance with the larger set of cells, wherein outputting the recommendation associated with the network slice is in accordance with training the machine learning model.

20. A method for network slice management in a wireless network, comprising:

receiving, at a device associated with service management of the wireless network, a request to admit a network slice in the wireless network, the request indicating one or more parameters associated with a service level agreement of the network slice;

selecting, in accordance with the one or more parameters associated with the service level agreement, a respective physical resource block (PRB) allocation of the network slice for each cell of a set of cells of the wireless network, wherein selecting the respective PRB allocation of the network slice for each cell of the set of cells further comprises:

predicting a first PRB allocation of the network slice for a first cell of the set of a cells in accordance with the one or more parameters associated with the service level agreement and first observed network conditions at the first cell; and predicting a second PRB allocation of the network slice for a second cell of the set of cells in accordance with the one or more parameters associated with the service level agreement and second observed network conditions at the second cell; and outputting, to a network slice management function and in accordance with a respective PRB utilization at each cell of the set of cells and the respective PRB allocation of the network slice for each cell of the set of cells, a recommendation associated with the network slice, the recommendation comprising an approval or a rejection of the network slice to the wireless network.

21. The method of claim 20, wherein selecting the respective PRB allocation of the network slice for each cell of the set of cells further comprises:

predicting the respective PRB allocation of the network slice for each cell of the set of cells in accordance with the one or more parameters associated with the service level agreement.

22. The method of claim 21, wherein predicting the respective PRB allocation of the network slice for each cell of the set of cells further comprises:

predicting the respective PRB allocation of the network slice for each cell of the set of cells in accordance with both the one or more parameters associated with the service level agreement and observed network conditions at the set of cells.

23. The method of claim 21, further comprising:

scanning the set of cells of the wireless network in accordance with respective summations of respective PRB utilizations at the set of cells and respective PRB allocations of the network slice for the set of cells, wherein outputting the recommendation associated with the network slice is in accordance with scanning the set of cells.

24. The method of claim 23, wherein outputting the recommendation associated with the network slice comprises:

outputting, in accordance with greater than or equal to a threshold quantity of cells of the set of cells being able to accommodate the respective summations, the approval of the network slice; or outputting, in accordance with fewer than the threshold quantity of cells of the set of cells being able to accommodate the respective summations, the rejection of the network slice.

25. The method of claim 23, wherein outputting the recommendation associated with the network slice comprises:

outputting, in accordance with cells of the set of cells that are able to accommodate the respective summations serving greater than or equal to a threshold quantity of intended users, the approval of the network slice; or outputting, in accordance with the cells of the set of cells that are able to accommodate the respective summations serving fewer than the threshold quantity of intended users, the rejection of the network slice.

26. The method of claim 20, further comprising:

training a machine learning model to output the recommendation associated with the network slice in accordance with one or more of a prediction of the respective PRB allocation of the network slice for each cell of the set of cells, the respective PRB utilization at each cell of the set of cells, one or more radio frequency metrics associated with the set of cells, or a morphology associated with the set of cells, wherein the prediction is associated with observed network conditions at the set of cells of the wireless network.

27. A device associated with service management of a wireless network, comprising:

means for receiving a request to admit a network slice in the wireless network, the request indicating one or more parameters associated with a service level agreement of the network slice;

means for selecting, in accordance with the one or more parameters associated with the service level agreement, a respective physical resource block (PRB) allocation of the network slice for each cell of a set of cells of the wireless network, wherein the means for selecting the respective PRB allocation of the network slice for each cell of the set of cells further comprise:

means for predicting a first PRB allocation of the network slice for a first cell of the set of a cells in accordance with the one or more parameters associated with the service level agreement and first observed network conditions at the first cell; and means for predicting a second PRB allocation of the network slice for a second cell of the set of cells in accordance with the one or more parameters associated with the service level agreement and second observed network conditions at the second cell; and means for outputting, to a network slice management function and in accordance with a respective PRB utilization at each cell of the set of cells and the respective PRB allocation of the network slice for each cell of the set of cells, a recommendation associated with the network slice, the recommendation comprising an approval or a rejection of the network slice to the wireless network.

28. A non-transitory computer-readable medium storing code for network slice management in a wireless network, the code comprising instructions executable by a processing system to:

receive, at a device associated with service management of the wireless network, a request to admit a network slice in the wireless network, the request indicating one or more parameters associated with a service level agreement of the network slice;

select, in accordance with the one or more parameters associated with the service level agreement, a respective physical resource block (PRB) allocation of the network slice for each cell of a set of cells of the wireless network, wherein, to select the respective PRB allocation of the network slice for each cell of the set of cells, the code further comprises instructions executable by the processing system to:

predict a first PRB allocation of the network slice for a first cell of the set of a cells in accordance with the one or more parameters associated with the service level agreement and first observed network conditions at the first cell; and predict a second PRB allocation of the network slice for a second cell of the set of cells in accordance with the one or more parameters associated with the service level agreement and second observed network conditions at the second cell; and output, to a network slice management function and in accordance with a respective PRB utilization at each cell of the set of cells and the respective PRB allocation of the network slice for each cell of the set of cells, a recommendation associated with the network slice, the recommendation comprising an approval or a rejection of the network slice to the wireless network.

* * * * *